(12) United States Patent
Gopal

(10) Patent No.: US 10,509,651 B2
(45) Date of Patent: Dec. 17, 2019

(54) MONTGOMERY MULTIPLICATION PROCESSORS, METHODS, SYSTEMS, AND INSTRUCTIONS

(71) Applicant: Intel Corporation, Santa Clara, CA (US)

(72) Inventor: Vinodh Gopal, Westborough, MA (US)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 15/388,642

(22) Filed: Dec. 22, 2016

(65) Prior Publication Data

US 2018/0181391 A1 Jun. 28, 2018

(51) Int. Cl.
| | |
|---|---|
| *G06F 9/302* | (2018.01) |
| *G06F 9/34* | (2018.01) |
| *G06F 7/72* | (2006.01) |
| *G06F 7/52* | (2006.01) |
| *G06F 9/30* | (2018.01) |
| *G06F 9/35* | (2018.01) |
| *G06F 7/544* | (2006.01) |

(52) U.S. Cl.
CPC ............ *G06F 9/3001* (2013.01); *G06F 7/728* (2013.01); *G06F 9/3016* (2013.01); *G06F 9/30101* (2013.01); *G06F 9/35* (2013.01); *G06F 7/5443* (2013.01); *G06F 7/727* (2013.01); *G06F 9/30065* (2013.01); *G06F 9/30167* (2013.01)

(58) Field of Classification Search
CPC .. G06F 9/3001; G06F 9/30101; G06F 9/3016; G06F 9/30167; G06F 9/35; G06F 9/30021; G06F 9/30025; G06F 9/30029; G06F 9/30032; G06F 9/30065; G06F 9/325; G06F 9/3004; G06F 9/30043; G06F 7/727; G06F 7/728; G06F 7/729; G06F 2207/7247; G06F 7/5443
USPC ................ 712/208, 221–224; 718/491, 603; 708/491, 603
See application file for complete search history.

(56) References Cited

U.S. PATENT DOCUMENTS

| | | | |
|---|---|---|---|
| 6,914,983 B2* | 7/2005 | Chen ....................... | G06F 7/722 380/28 |
| 6,988,184 B2* | 1/2006 | Ganapathy ............ | G06F 9/3001 708/501 |
| 2005/0256920 A1* | 11/2005 | Crispin ................... | G06F 7/728 708/491 |

(Continued)

OTHER PUBLICATIONS

Extended European Search Report for Application No. 17204239.2, dated May 9, 2018, 8 pages.

(Continued)

*Primary Examiner* — Daniel H Pan
(74) *Attorney, Agent, or Firm* — NDWE, LLP

(57) ABSTRACT

A processor of an aspect includes a plurality of registers, and a decode unit to decode an instruction. The instruction is to indicate at least one storage location that is to store a first integer, a second integer, and a modulus. An execution unit is coupled with the decode unit, and coupled with the plurality of registers. The execution unit, in response to the instruction, is to store a Montgomery multiplication product corresponding to the first integer, the second integer, and the modulus, in a destination storage location. Other processors, methods, systems, and instructions are disclosed.

22 Claims, 8 Drawing Sheets

(56) References Cited

U.S. PATENT DOCUMENTS

| | | | | |
|---|---|---|---|---|
| 2009/0089350 A1* | 4/2009 | Sauzet | ............... | G06F 7/728 |
| | | | | 708/491 |
| 2011/0270906 A1* | 11/2011 | Lambert | ............ | G06F 7/728 |
| | | | | 708/491 |
| 2011/0276790 A1* | 11/2011 | Olson | ............... | G06F 7/728 |
| | | | | 712/222 |
| 2013/0311533 A1* | 11/2013 | Lee | ............ | G06F 7/728 |
| | | | | 708/491 |
| 2017/0010866 A1* | 1/2017 | Kaluzhny | ......... | G06F 21/602 |

OTHER PUBLICATIONS

Grobschadl J., et al., "Performance Evaluation of Instruction Set Extensions for Long Integer Modular Arithmetic on a SPARC V8 Processor," 10th Euromicro Conference on Digital System Design Architectures, Methods and Tools (DSD 2007), IEEE, Aug. 1, 2007, pp. 680-689.

Koc C.K., et al., "Analyzing and Comparing Montgomery Multiplication Algorithms," Internet Citation, Jun. 1, 1996, Retrieved from: http://citeseer.ist.psu.edu/viewdoc/download on May 4, 2011, 18 pages.

Intention to Grant for Application No. 17204239.2, dated Sep. 6, 2019, 12 pages.

* cited by examiner

MONTGOMERY MULTIPLICATION PROCESSORS, METHODS, SYSTEMS, AND INSTRUCTIONS

BACKGROUND

Technical Field

Embodiments described herein generally relate to processors. More specifically embodiments described herein generally relate to performing Montgomery multiplication in processor.

Background Information

Cryptography is widely used to help protect the confidentiality and integrity of data and/or communications. Two commonly used types of cryptography are symmetric key cryptography and asymmetric or public-key cryptography.

Symmetric key cryptography uses a single type of key. The same key is used to both encrypt data and decrypt data. The same key is also used to both generate a digital signature and verify the digital signature.

In contrast, public-key cryptography uses two different types of keys. One of the keys is secret or private, whereas the other key is publicly available. The so called public and private keys are used for different and complementary purposes. For example, the public key may be used to encrypt data, whereas the private key may be used to decrypt the encrypted data. As another example, the private key may be used to generate a digital signature, whereas the public key may be used to verify the digital signature.

Various types of public key cryptography algorithms are known in the arts. One currently widely used public key cryptography algorithm is the RSA algorithm (named after its authors Rivest, Shamir, Adleman). Another public key cryptography algorithm is the Digital Signature Algorithm (DSA) algorithm. Yet another public key cryptography algorithm is the Diffie-Hellman key exchange algorithm, which is sometimes referred to as Diffie-Hellman, or simply as D-H. Such public key cryptography algorithms are widely used in Internet and other network communications to help establish a secure channel, securely exchange keys, and exchange and verifying certificates, and the like.

BRIEF DESCRIPTION OF THE DRAWINGS

The invention may best be understood by referring to the following description and accompanying drawings that are used to illustrate embodiments. In the drawings.

DETAILED DESCRIPTION OF EMBODIMENTS

Disclosed herein are embodiments of instructions, embodiments of processors to perform the instructions, embodiments of methods performed by the processors when performing the instructions, embodiments of systems incorporating one or more processors to perform the instructions, and embodiments of programs or machine-readable mediums providing the instructions. In some embodiments, the processors may have a decode unit or other logic to receive and/or decode the instruction, and an execution unit or other logic to perform the instruction. In the following description, numerous specific details are set forth (e.g., specific instruction operations, sequences of operations, processor configurations, microarchitectural details, etc.). However, embodiments may be practiced without these specific details. In other instances, well-known circuits, structures and techniques have not been shown in detail to avoid obscuring the understanding of the description.

Figure 1:
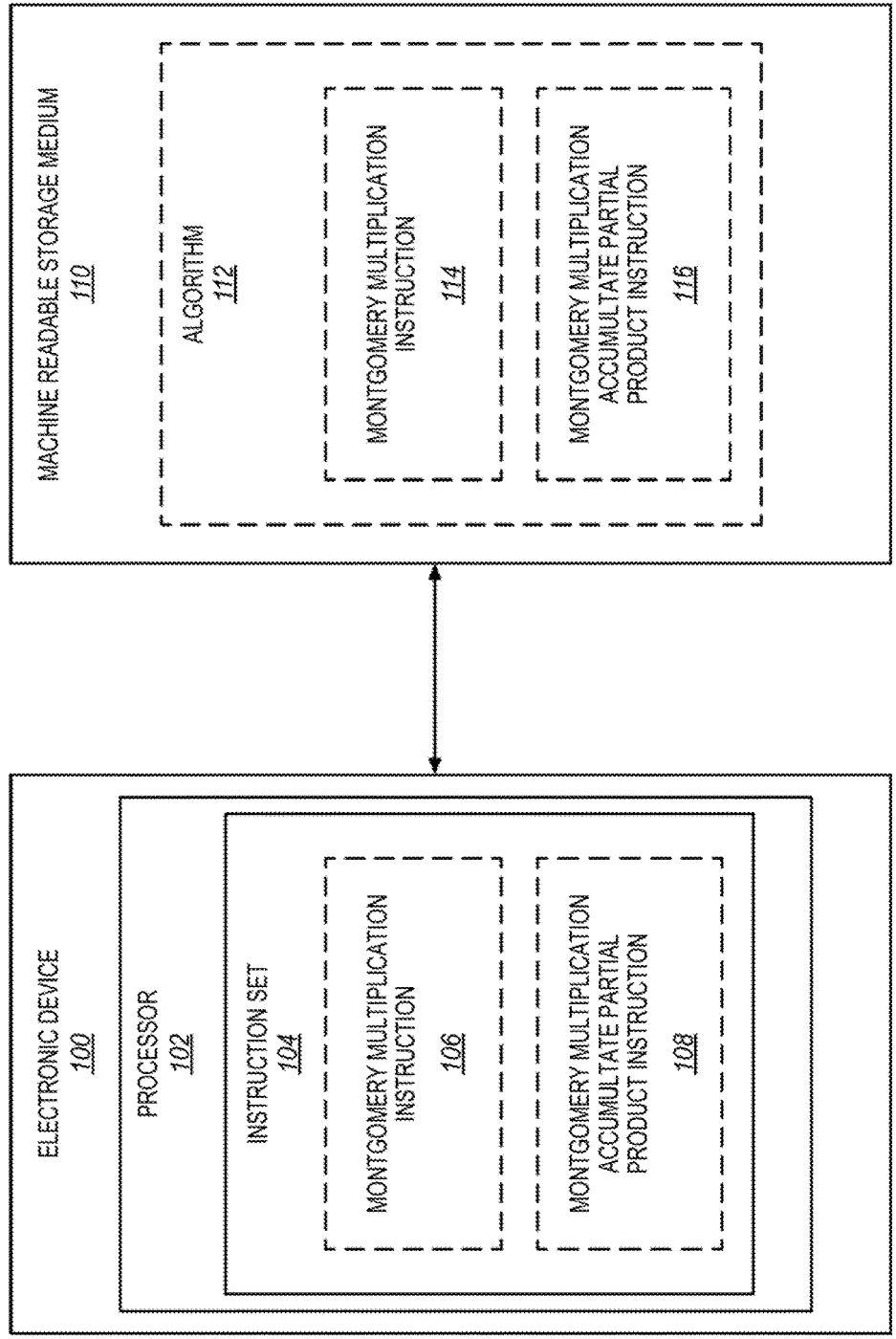
FIG. 1 is a block diagram of an embodiment of an electronic device coupled with an embodiment of a machine-readable storage medium.

FIG. 1 is a block diagram of an embodiment of an electronic device 100 coupled with an embodiment of a machine-readable storage medium 110. The electronic device may represent a desktop computer, a laptop computer, a notebook computer, a tablet computer, a server, a network device (e.g., a router or switch), a smartphone, a set-top box, any of various other types of computer systems.

The electronic device includes an embodiment of a processor 102. In various embodiments, the processor may be a general-purpose processor (e.g., a general-purpose microprocessor or central processing unit (CPU)) or a special-purpose processor. Examples of suitable special-purpose processors include, but are not limited to, cryptographic processors, communications processors, network processors, co-processors, embedded processors, digital signal processors (DSPs), and the like. The processor may have any of various complex instruction set computing (CISC) architectures, reduced instruction set computing (RISC) architectures, very long instruction word (VLIW) architectures, hybrid architectures, other types of architectures, or have a combination of different architectures (e.g., different cores may have different architectures).

The processor has an instruction set 104. Without limitation, the instruction set may include number of different types of instructions. The instructions of the instruction set may represent macroinstructions, machine language instructions, machine code instructions, other instructions that the processor is natively able to decode, or the like. In some embodiments, the instruction set may include at least one embodiment of an instruction that is useful to accelerate Montgomery multiplication. In some embodiments, the instruction set may optionally include a Montgomery multiplication instruction 106 that is operative to cause the processor to perform a Montgomery multiplication. In some embodiments, the instruction set may optionally include a Montgomery multiplication accumulate partial product instruction 108 that is operative to cause the processor to perform a portion of a Montgomery multiplication involving accumulating a partial product. Either one of these instructions, or both, may optionally be included. Advantageously, including at least one of such instructions in the instruction set may generally help to accelerate or improve the performance of performing Montgomery multiplication as compared to if a software sequence of a greater number of instructions were used.

Referring again to FIG. 1, the embodiment of the machine-readable storage medium 110 may be operative to store information (e.g., instructions) in a form that is readable by the electronic device 100. By way of example, the machine-readable storage medium may include any of various known types of memories, data storage devices, data storage disks, or the like. The machine-readable storage medium may store an algorithm 112 (e.g., a sequence of instructions). In some embodiments, the algorithm may include a cryptographic algorithm, such as, for example, an RSA (Rivest, Shamir, Adleman), Digital Signature Algorithm (DSA), Diffie-Hellman, or elliptic curve public key cryptographic algorithm, although the scope of the invention is not so limited. In some embodiments, the algorithm may have an instance of at least one embodiment of an instruction that is useful to accelerate Montgomery multiplication. In some embodiments, the algorithm may optionally include a Montgomery multiplication instruction 114 (e.g., an instance of the instruction 106) that if and/or when performed is operative to cause the processor to perform a Montgomery multiplication. In some embodiments, the algorithm may optionally include a Montgomery multiplication accumulate partial product instruction 116 (e.g., an instance of the instruction 108) that if and/or when performed is operative to cause the processor to perform a portion of a Montgomery multiplication involving accumulating a partial product.

Montgomery multiplication may provide a computationally and/or time efficient way to perform large integer modular multiplication. Large integer modular multiplication generally includes multiplying two or more large integers (e.g., that include a large number of bits), and taking the product modulo a modulus. As used herein, the term "large integer" refers to an integer that has at least 256-bits, and may optionally have many more bits. In embodiments pertaining to RSA, DSA, and/or Diffie-Hellman, the large integers may have 512-bits, 1024-bits, or other even larger numbers of bits (e.g., ranging up to about 16384-bits, or more). The large integer modular multiplication of a first large integer (X), and a second large integer (Y), taken modulo a modulus (N), may be represented by the following Equation 1:

$$A = X*Y \bmod N \qquad \text{Equation 1}$$

The large integer modular multiplication product or result (A) equals the remainder, when the first large integer (X) and the second large integer (Y) are multiplied to generate a product, and then the product is taken modulo (mod) the modulus (N). The modulo (mod) operation effectively determines the remainder after performing a division-like operation of the product by the modulus.

Large integer modular exponentiation is related to large integer modular multiplication. The large integer modular exponentiation of a first large integer base (B), raised to a second large integer exponent (E), taken modulo a modulus (N), may be represented by the following Equation 2:

$$A = B^E \bmod N \qquad \text{Equation 2}$$

The exponentiation involves taking or raising the base (B) to the power of the exponent (E). By way of example, if the exponent is a positive integer, then the exponentiation may represent multiplying an exponent number of bases together (e.g., $B*B*B*B \ldots$). The large integer modular exponentiation result (A) equals the remainder, when the result of the exponentiation is taken modulo (mod) the modulus (N). Multiplying these bases together may represent a form of and/or may at least be related to large integer modular multiplication such that in some embodiments large integer modular multiplication may be used to help perform large integer modular exponentiation. Moreover, larger integer modular multiplication is typically involved also when the modular exponentiation is performed with Montgomery reduction.

Such large integer modular multiplication, large integer modular exponentiation, large integer modular arithmetic (e.g., including multiplication), and the like, are widely used in cryptographic algorithms, such as, for example, RSA, DSA, and Diffie-Hellman, as well as various other algorithms and uses. As one illustrative example, in the case of RSA, the RSA sign process takes a message, pads it, performs a large integer modular exponentiation using a padded message and the secret/private key (e.g., a large integer) as the exponent, and the complementary verification process performs a modular exponentiation using the corresponding public very short exponent. In addition, such large integer modular multiplication, large integer modular exponentiation, large integer modular multiplying arithmetic, and the like, are used in other cryptographic algorithms, such as, for example, elliptic curve cryptography (ECC). By way of example, in ECC, they may be used to compute point adds and/or point doubles. ECC is also used in various applications, such as, for example, TLS/SSL, National Security Suite-B algorithms, P-256 for secured Border Gateway Protocol, as well as other uses. Such large integer modular multiplication may also be used in various other cryptographic, computer science, mathematical, and/or other uses either currently know or developed in the future.

One challenge is that performing large integer modular multiplication may tend to be relatively computationally intensive and/or time consuming. This is due in part to the multiplications. However, performing the modular or division-like operations generally tends to be even more computationally intensive and/or time consuming than the multiplications. This may tend to be especially true when the sizes of the integers involved are large, very large (e.g., on the order of several thousand bits), or extremely large (e.g., on the order of eight thousand bits or more).

Figure 2:
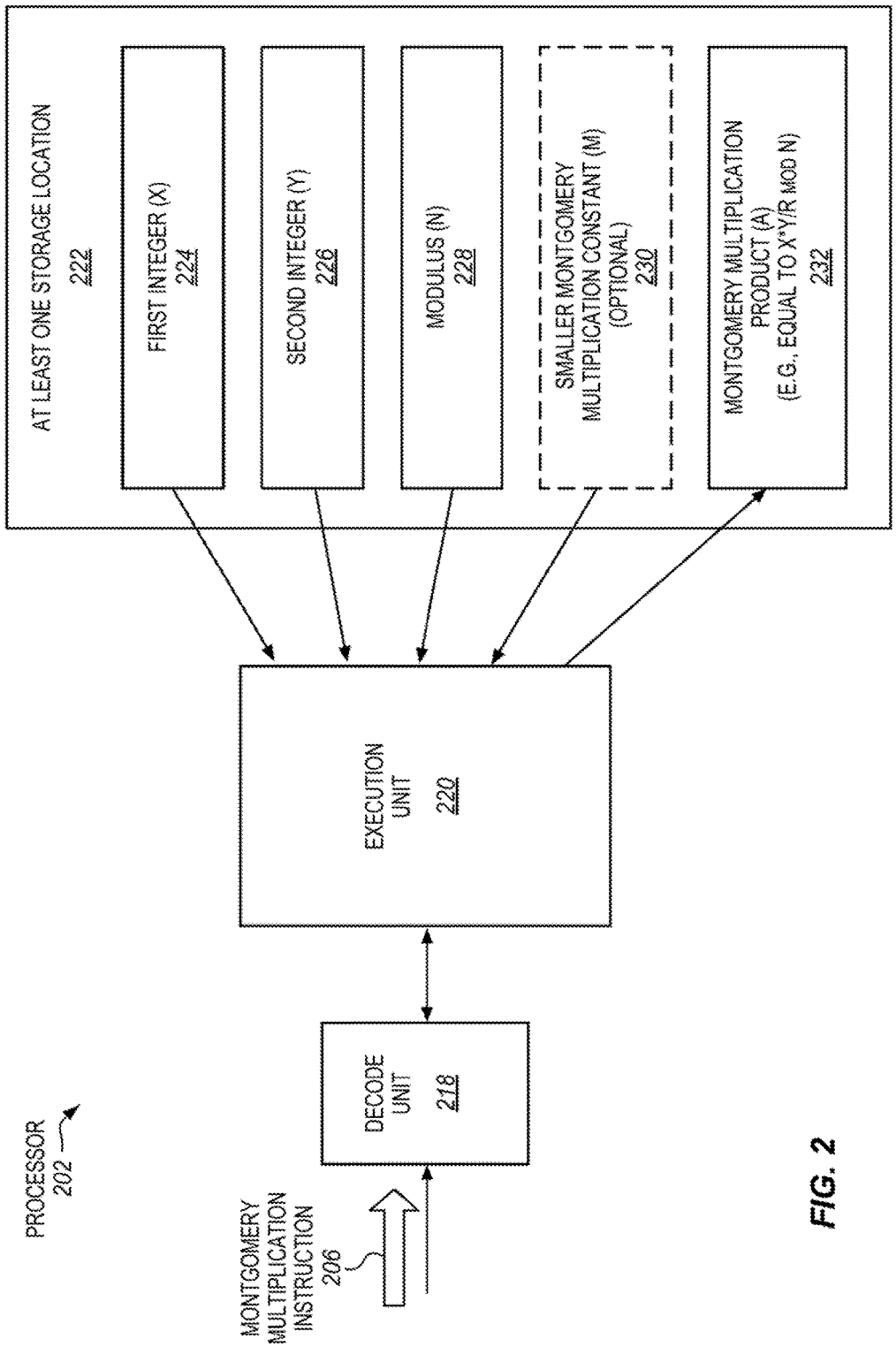
FIG. 2 is a block diagram of an embodiment of a processor that is operative to perform an embodiment of a Montgomery multiplication instruction.

FIG. 2 is a block diagram of an embodiment of a processor 202 that is operative to perform an embodiment of a Montgomery multiplication instruction 206. The processor may be one of the various different types of processors previously mentioned for the processor 102 of FIG. 1 (e.g., a general-purpose processor, a special purpose processor, a CISC, RISC, or VLIW architecture, etc.). In some embodiments, the processor may include and/or disposed on at least one integrated circuit or semiconductor die. In some embodiments, the processor may include at least some hardware (e.g., transistors, integrated circuitry, non-volatile memory storing microcode or other execution unit level instructions, or the like).

During operation, the processor 202 may receive the Montgomery multiplication instruction 206. For example, the instruction may be received from memory on an interconnect. The instruction may represent a macroinstruction, machine language instructions, machine code instructions, instruction that the processor is able to decode, or instruction of an instruction set of the processor.

In some embodiments, the Montgomery multiplication instruction may specify (e.g., explicitly specify) or otherwise indicate (e.g., implicitly indicate) at least one storage location 222 that is to store a first integer (X) 224, a second integer (Y) 226, and a modulus (N) 228. The at least one storage location may variously represent one or more storage locations in memory, one or more architectural registers of the processor, one or more dedicated storage locations of the processor, or various combinations thereof. The first integer, the second integer, and the modulus (N) may represent source operands of the Montgomery multiplication instruction. The first and second integers may represent those source operands on which Montgomery multiplication is to be performed and taken modulo the modulus. Typically, in accordance with Montgomery multiplication the numerical values of the first and second integers should be less than the value of the modulus, the numerical value of the modulus should typically be an odd number, and the sizes in bits of the first and second integers and the modulus should each typically be the same. As previously mentioned, the first and second integers, and the modulus, may each represent a large integer having at least 256-bits and optionally more (e.g., optionally 1024-bits, 2048-bits, 4096-bits, 8192-bits, or 16384-bits). The larger refers to the bit size of the integers not necessarily their numerical values.

In some embodiments, the Montgomery multiplication instruction may also optionally indicate, as a source operand in the at least one storage location 222, a first "smaller" Montgomery multiplication constant (M) 230, although this is not required. Two different constants may be associated with Montgomery multiplication. One is the "smaller" Montgomery multiplication constant (M) and the other is a second "larger" Montgomery multiplication constant (R). As used herein, the terms "smaller" and "larger" are relative terms, not absolute terms, which are relative to one another (e.g., the smaller Montgomery multiplication constant (M) is relatively smaller than the larger Montgomery multiplication constant (R)). Commonly, the smaller Montgomery multiplication constant (M) may have a size of 64-bits or less). Conversely, the larger Montgomery multiplication constant (R) commonly is the same size as the modulus (N), which is typically a large integer of at least 256-bits or optionally more.

The smaller Montgomery multiplication constant (M) may be expressed by and/or equal to an evaluation of the following Equation 3:

$$M = -N^{-1} \bmod (2^{64}) \quad \text{Equation 3}$$

This equation shows that the smaller Montgomery multiplication constant (M) is the negative inverse of the modulus (N) taken modulo a value, which in this case is two raised to the power sixty-four. The smaller Montgomery multiplication constant (M) is referred to as a constant since it is a function only of the modulus (N) which is typically fixed for the instruction (e.g., fixed for common algorithms). The raising of two to the power sixty-four assumes a 64-bit word length and/or data path size. Alternatively, if a 32-bit word length and/or data path size, or some other length and/or size, is used, then two may instead be raised to the power thirty-two, or another length and/or size.

One possible advantage of providing the smaller Montgomery multiplication constant as a source operand is that it may be pre-calculated or pre-computed in advance so that it doesn't need to be performed within the confines of execution of the Montgomery multiplication instruction (e.g., each different instance thereof). For example, since the smaller Montgomery multiplication constant is only a function of the modulus and the architectural word length or size, it is possible to pre-calculate one or more smaller Montgomery multiplication constant values for one or more modulus values for a given processor architecture word length or size, and store them in a table (e.g., in memory) so that they don't need to be calculated in real time. However, providing the smaller Montgomery multiplication constant as a source operand of the instruction is optional not required.

In other embodiments, if the smaller Montgomery multiplication constant (M) is not provided as a source operand, then it may instead optionally be calculated or generated by the processor in response to and/or during performance the Montgomery multiplication instruction. That is, the Montgomery multiplication instruction may control and/or cause the processor to generate the smaller Montgomery multiplication constant (M). If desired, in some embodiments, once it has been calculated it may optionally be preserved or stored on the processor, to help spread out or amortize the cost of calculating the smaller Montgomery multiplication constant over more calculations. For example, in some embodiments, the processor may optionally include a dedicated (e.g., non-architectural) register, a scratchpad memory, a hardware implemented table, a dedicated non-coherent cache, or other suitable storage to store the smaller Montgomery multiplication constant. In such embodiments, the performance of the Montgomery multiplication instruction may include initially checking such storage to see if an appropriate (e.g., for the modulus and architectural word size/length) smaller Montgomery multiplication constant has already been calculated and stored in the storage. If it has been stored, then it may be retrieved from the storage so that it doesn't need to be recalculated as part of performing the instruction. One possible advantage of calculating or generating the smaller Montgomery multiplication constant (M) as part of performing the Montgomery multiplication instruction is that it may allow the Montgomery multiplication instruction to be independent of and/or agnostic to the word size/length of the processor. For example, this may allow the same instruction (e.g., the same opcode) to be performed when the word size and/or length of the processor is 32-bits, 64-bits, or some other size.

The Montgomery multiplication instruction may specify (e.g., explicitly specify) or otherwise indicate (e.g., implicitly indicate) the at least one storage location 222 in different ways in different embodiments. As one example, the instruction may optionally have an operand specification field or set of bits within its instruction encoding to explicitly specify a register or other storage location. As another example, a register or other storage location may optionally be implicit to the instruction (e.g., its opcode), rather than the instruction needing to have non-opcode bits in its instruction encoding to explicitly specify the register or other storage location. For example, the processor may inherently, impliedly, or otherwise implicitly understand to use the storage location upon detection of the Montgomery multiplication instruction (e.g., its opcode).

Referring again to FIG. 2, the processor includes a decode unit or decoder 218. The decode unit may receive and decode the Montgomery multiplication instruction. The decode unit may output one or more relatively lower-level instructions or control signals (e.g., one or more microinstructions, micro-operations, micro-code entry points, decoded instructions or control signals, etc.), which reflect, represent, and/or are derived from the relatively higher-level Montgomery multiplication instruction. The decode unit may be implemented using various mechanisms including, but not limited to, microcode read only memories (ROMs), look-up tables, hardware implementations, programmable logic arrays (PLAs), other mechanisms suitable to implement decode units, and combinations thereof. In some embodiments, the decode unit may include at least one input structure (e.g., a port, interconnect, or an interface) to receive the Montgomery multiplication instruction, an instruction recognition and decode logic coupled therewith to recognize and decode the Montgomery multiplication instruction, and at least one output structure (e.g., a port, interconnect, or an interface) coupled therewith to output the lower-level instruction(s) or control signal(s). In some embodiments, the decode unit may be included on a die (e.g., on die with the execution unit 220). In some embodiments, the decode unit may include at least some hardware (e.g., one or more of transistors, integrated circuitry, on-die read-only memory or other non-volatile memory storing microcode or other execution unit-level control signals, or the like).

Referring again to FIG. 2, an execution unit 220 is coupled with the decode unit 218. The execution unit may receive the one or more decoded or otherwise converted instructions or control signals that represent and/or are derived from the Montgomery multiplication instruction. The execution unit may also be coupled with the at least one storage location 222 that is used to store the source and/or destination operands of the Montgomery multiplication instruction.

The execution unit may be operative in response to and/or due to the Montgomery multiplication instruction (e.g., in response to one or more instructions or control signals decoded from the instruction and/or in response to the instruction being decoded and/or in response to the instruction being provided to a decoder) to generate and store a Montgomery multiplication product (A) 232 corresponding to the first integer (X) 224, the second integer (Y) 226, and the modulus (N) 228, in a destination storage location indicated by the Montgomery multiplication instruction. The Montgomery multiplication product (A) may represent a result or destination operand of the instruction. In some embodiments, the Montgomery multiplication product may be equal to a product of the first integer (X) and the second integer (Y), divided by a larger Montgomery multiplication constant (R), taken modulo the modulus (N). The larger Montgomery multiplication constant (R) may be expressed by and/or consistent with and/or equal to an evaluation of, the following Equation 4:

$$R = 2^{size} \bmod N \qquad \text{Equation 4}$$

This equation shows that the larger Montgomery multiplication constant (R) is two raised to the power of a size in bits of the modulus, taken modulo (mod) the modulus (N). By way of example if the modulus is 1024-bits, then size is 1024. The larger Montgomery multiplication constant (R) is referred to as a constant since it is a function only of the modulus (N) which is typically fixed for the instruction (e.g., fixed for common algorithms).

The execution unit and/or the processor may include specific or particular logic (e.g., transistors, integrated circuitry, or other hardware potentially combined with firmware (e.g., instructions stored in non-volatile memory) that is operative to perform the Montgomery multiplication instruction and/or store the Montgomery multiplication product (A) 232 in response to and/or as a result of the Montgomery multiplication instruction (e.g., in response to one or more instructions or control signals decoded from the Montgomery multiplication instruction). In some embodiments, the execution unit may include one or more input structures (e.g., a port, interconnect, or interface to receive the source operands, logic operative to perform Montgomery multiplication coupled therewith to receive and process the source operands and generate the Montgomery multiplication product, and one or more output structures (e.g., a port, interconnect, or interface) coupled therewith to output the Montgomery multiplication product. In some embodiments, the logic operative to perform Montgomery multiplication may include an arithmetic logic unit (ALU), optionally including multiply-add logic and shift logic, and Montgomery multiplication control logic to control the ALU to perform the Montgomery multiplication. By way of example, the Montgomery multiplication control logic may include a microcode engine, a microsequence state machine, or the like, or a combination thereof. In some embodiments, the execution unit may optionally include the logic shown and described for FIG. 3, although the scope of the invention is not so limited.

To avoid obscuring the description, a relatively simple processor 202 has been shown and described. However, the processor may optionally include other processor components. For example, various embodiments may include various combinations and configurations of the components shown and described for FIG. 6. The components of the processor may be coupled together to allow them to operate as intended.

Figure 3:
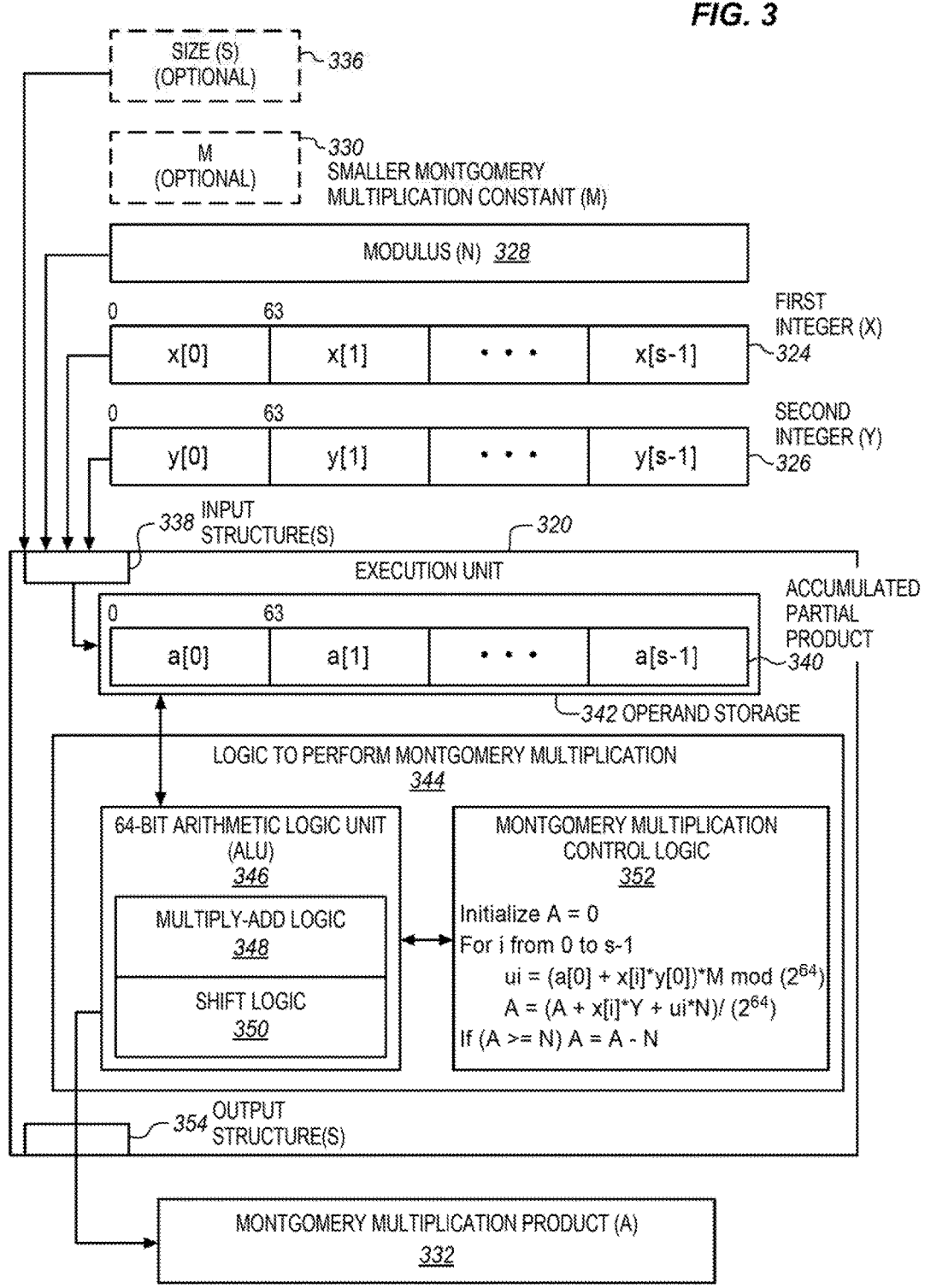
FIG. 3 is a block diagram of an example embodiment of an execution unit to perform an example embodiment of a Montgomery multiplication operation in response to an example embodiment of a Montgomery multiplication instruction.

FIG. 3 is a block diagram illustrating an example embodiment of an execution unit 320 to perform an example embodiment of a Montgomery multiplication operation in response to an embodiment of a Montgomery multiplication instruction. The execution unit 320 may be the same as, similar to, or different than, the execution unit 220 of FIG. 2. The Montgomery multiplication instruction may specify or otherwise indicate a first integer (X) 324, a second integer (Y) 326, and a modulus (N) 328. In some embodiments, the Montgomery multiplication instruction may optionally specify or otherwise indicate a smaller Montgomery multiplication constant (M) 330. Alternatively, the execution unit may optionally generate the smaller Montgomery multiplication constant (M) as part of performing the Montgomery multiplication instruction, as described elsewhere herein. The first integer (X), the second integer (Y), the modulus (N), and the smaller Montgomery multiplication constant (M) may each be the same as, similar to, or different than, the correspondingly named operands of FIG. 2. To avoid obscuring the description, the different and/or additional characteristics of the embodiments of FIG. 3 will primarily be described, without repeating all the characteristics which may optionally be the same or similar to those previously described for the embodiments of FIG. 2.

In some embodiments, the Montgomery multiplication instruction may optionally specify or otherwise indicate a size (s) in bits of the modulus 328. In various embodiments, the size may be indicated in an immediate of the Montgomery multiplication instruction or in a register or other storage location indicated by the Montgomery multiplication instruction. As shown in the illustrated example embodiment, the size (s) may be expressed as a number of 64-bit words or portions of the modulus (N). As one illustrative example, a size of thirty-two may be used to indicate a 2048-bit modulus (e.g., 32*64=2048). In other embodiments, the size may indicate a number of 8-bit, 16-bit, 32-bit, 128-bit, 256-bit, or 512-bit words or portions of the modulus. In other embodiments, the size may indicate the absolute size in bits of the modulus (e.g., the size may have a value of 1024 to indicate a 1024-bit modulus). In still other embodiments, the size may have a given number of possible values that arbitrarily are assigned to and may be used to select between a given number of possible sizes. For example, a 2-bit size field may have a value of 00 to select a 1024-bit modulus, a value of 01 to select a 2048-bit modulus, and a value of 10 to select an 8192-bit modulus. Still other approaches will be apparent to those skilled in the art and having the benefit of the present disclosure. As yet another option, the Montgomery multiplication instruction may optionally have a fixed or implicit size for the modulus such that the size does not need to be provided as an input or source operand but rather may be implicit (e.g., to the opcode). For example, there may be one or more of a 1024-bit or 2048-bit version of the instruction each with different opcodes.

As shown in the illustration, the first integer and the second integer may be logically partitioned into multiple words, sections, or other portions. In the specific illustrated embodiment, they are partitioned into size (s) number of 64-bit words or portions, although the scope of the invention is not so limited. Specifically, the first integer (X) has a least significant 64-bit word x[0], a next-to-least significant 64-bit word x[1], up to a most significant 64-bit word x[s−1]. Similarly, the second integer (Y) has a least significant 64-bit word y[0], a next-to-least significant 64-bit word y[1], up to a most significant 64-bit word y[s−1].

The execution unit 320 is coupled to receive the first integer (X), the second integer (Y), the modulus (N), optionally the size (s), and optionally the smaller Montgomery multiplication constant (M). In some embodiments, the execution unit may have at least one input structure 338 (e.g., a port, interconnect, or interface) to receive source operands. In some embodiments, the execution unit may optionally have one or more temporary registers or other internal operand storage 342 to store the source operands. The operand storage may also be operative to store an accumulated partial product 340. The accumulated partial product may represent a running accumulation value or intermediate value corresponding to the in-progress Montgomery multiplication product. As shown, the accumulated partial product may also be logically divided into a least significant 64-bit word a[0], a next-to-least significant 64-bit word a[1], up to a most significant 64-bit word a[s−1], where s again represents the number of 64-bit words in the modulus, in this example.

The execution unit may also include logic to perform Montgomery multiplication 344 coupled with the operand storage 342. In some embodiments, such logic may include an arithmetic logic unit (ALU) 346. In some embodiments, the ALU may include multiply-add logic 348 and shift logic 350. The arithmetic logic unit may either be optionally dedicated to performing the Montgomery multiplication instruction or may optionally be shared by other instructions of different types. In some embodiments, the execution unit may also include Montgomery multiplication control logic 352 to control the ALU and/or the execution unit to process the source operands and perform the Montgomery multiplication. Examples of suitable Montgomery multiplication control logic includes, but is not limited to, a microcode engine, a microsequenced state machine, or the like, or a combination thereof.

In some embodiments, the Montgomery multiplication control logic may include logic to control the ALU and/or the execution unit to process the source operands and perform the Montgomery multiplication according to and/or consistent with and/or equivalent to the following pseudocode 353:

Initialize A=0
For i from 0 to s−1//s is size of modulus in number of 64-bit portions $$ui=(a[0]+x[i]*y[0])*M \bmod(2^{64})$$

$$A=(A+x[i]*Y+ui*N)/(2^{64})$$

If (A>=N) then A=A−N
Store (A)//A=X*Y*R$^{-1}$ mod N, where R=2$^{(s*64)}$ mod N In this pseudocode, A initially represents the accumulated partial product and ultimately represents the Montgomery multiplication product. The i represents a loop counter, the s represents the size of the modulus in number of 64-bit portions, and the ui is an intermediate parameter or intermediate result of prior calculations for the i-th iteration of the Montgomery multiplication. The a[i], x[i], y[i] are the i-th 64-bit portions, respectively, of the accumulated partial product (A), the first integer (X), and the second integer (Y), as described above. M is the smaller Montgomery multiplication constant 330, Y is the entire second integer 326, and N is the modulus 328. Advantageously, the Montgomery multiplication may allow modular multiplication to be performed without having to perform costly modular operations or division-like operations. By way of example, the execution unit may implement the mod ($2^{64}$) and divide by ($2^{64}$) operations in the pseudocode above as right shifts in the shift logic 450, by ignoring least significant 64-bit words, or the like, instead of performing such modular or division-like operations.

The execution unit, upon completion of the Montgomery multiplication, may be operative, responsive to the Montgomery multiplication instruction, to store a Montgomery multiplication product (A) in a destination storage location indicated by the instruction. In some embodiments, the execution unit may have at least one output structure 354 (e.g., a port, interconnect, or interface) to output the Montgomery multiplication product (A).

Figure 4:
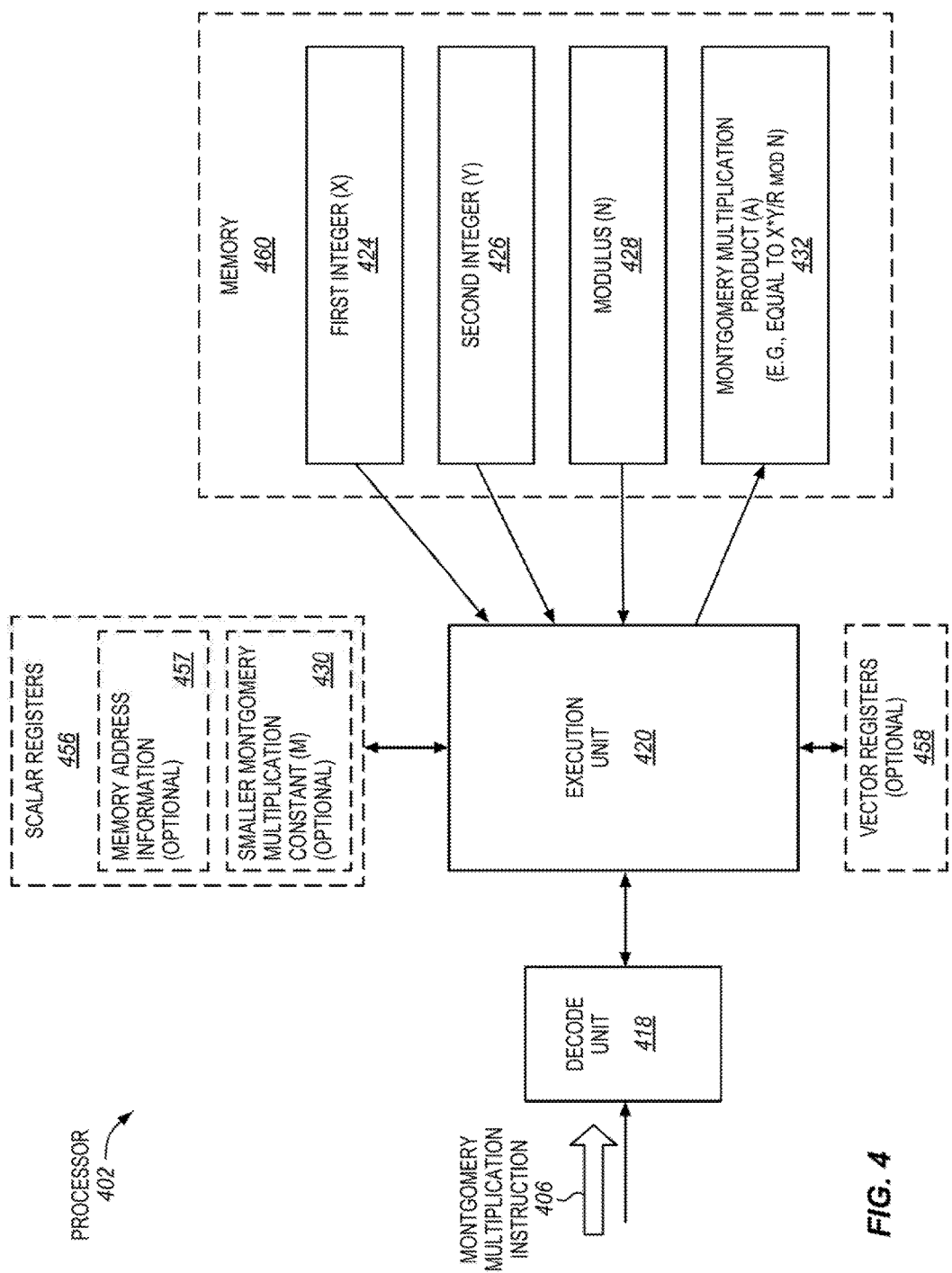
FIG. 4 is a block diagram of an example embodiment of a processor that is operative to perform an example embodiment of a Montgomery multiplication instruction.

FIG. 4 is a block diagram of an example embodiment of a processor 402 that is operative to perform an example embodiment of a Montgomery multiplication instruction 406. The processor 402 may be the same as, similar to, or different than, the processor 202 of FIG. 2 and/or the processor 302 of FIG. 3. The processor includes a decode unit 418 that is operative to decode the instruction, an execution unit 420 that is operative to perform the instruction. Unless otherwise specified, these components may optionally be the same as or similar to (e.g., have any one or more characteristics that are the same or similar to) the correspondingly named components of FIG. 2 and/or FIG. 3. To avoid obscuring the description, the different and/or additional characteristics of the embodiment of FIG. 4 will primarily be described, without repeating all the characteristics which may optionally be the same or similar to those previously described for the embodiments of FIG. 2 and FIG. 3. The decode unit 418 may be operative to receive and decode the Montgomery multiplication instruction 406. In some embodiments, the Montgomery multiplication instruction may specify (e.g., explicitly specify) or otherwise indicate (e.g., implicitly indicate) at least one storage location that is to store a first integer (X) 424, a second integer (Y) 426, a modulus (N) 428, and optionally a smaller Montgomery multiplication constant (M) 430. As shown, in some embodiments, the first integer (X), the second integer (Y), and the modulus (N) may optionally each be stored in one or more storage locations in a memory 460, although this is not required. For example, in one particular embodiment, each of the first integer (X), the second integer (Y), and the modulus (N) may optionally be stored contiguously or adjacent to one another in the same single storage location in memory, although the scope of the invention is not so limited. These operands may be stored in various different orders or arrangements, such as, for example, XYN, NXY, NYX, YXN, etc. Alternatively, two or more storage locations in the memory may optionally be used. In still other embodiments, vector registers 458 of the processor, or other storage locations, may optionally be used for one or more of these source operands. In the illustration, the processor is coupled with, or otherwise in communication with, the memory. However, it is to be appreciated that embodiments of the invention pertain to a processor alone, which is capable of and/or operative to be coupled with the memory, but which has not yet been coupled with the memory (e.g., has not yet been deployed in a system).

The Montgomery multiplication instruction 406 may be operative to indicate a storage location in the memory 460 in different ways in different embodiments. In some embodiments, the instruction may be operative to indicate a register in a set of scalar registers 456 of the processor (e.g., 32-bit or 64-bit general purpose registers) that is used to store a pointer, effective address, or other memory address information 457. As one example, the instruction may have a register specification field to explicitly specify the register. Alternatively, the register may be implicit to the instruction (e.g., an opcode). In the later case, the processor may inherently, impliedly, or otherwise implicitly understand that the register is to be used when it decodes or recognizes the instruction without the instruction needing to have any non-opcode bits to explicitly specify the register. The memory address information from the register may potentially be combined with other memory address information, depending upon the particular memory addressing mode, to identify the storage location in the memory. By way of example, such additional memory address information may be stored in a data segment register, an extended segment register, another dedicated memory address register, or in the encoding of the instruction, or elsewhere.

Storing the operands in one or more storage locations in the memory 460 may tend to be beneficial especially when the operands are wider than the widest vector registers 458 of the processor. In such cases, each operand would need to be stored in two or more vector registers, which may tend to tie up more vector registers. However, the vector registers of the processor may also optionally be used to store the operands. Especially when the processor has wide vector registers that are at least as wide as the width in bits of the operands (e.g., the modulus (N)), the use of such vector register may tend to be beneficial.

Referring again to FIG. 4, in some embodiments, the Montgomery multiplication instruction may optionally indicate as a source operand a smaller Montgomery multiplication constant (M) 430. As shown, in some embodiments, the smaller Montgomery multiplication constant (M) may optionally be stored in a scalar register (e.g., a 32-bit or 64-bit general-purpose register) that may be explicitly specified by or implicitly indicated by the Montgomery multiplication instruction. In other embodiments, the smaller Montgomery multiplication constant (M) may optionally be stored in a storage location in the memory or another storage location. For example, the smaller Montgomery multiplication constant (M) may optionally be stored in a storage location in the memory with any one or more, or optionally all, of the first integer (X), the second integer (Y), and the modulus (N). In still other embodiments, the Montgomery multiplication constant (M) may not be provided as a source operand of the Montgomery multiplication instruction, but rather may be generated as part of performing the Montgomery multiplication instruction, as described elsewhere herein.

In some embodiments, the Montgomery multiplication instruction 406 may be operative to explicitly specify or indicate a size of the modulus (N) 428. For example, in some embodiments, the instruction may have an immediate (e.g., an 8-bit immediate) to indicate the size of the modulus. The size may be indicated in the various was described elsewhere herein. As one example, the instruction may have an immediate that is to indicate the size of the modulus as a number of fixed bit length segments each having a length that is one of 8-bits, 16-bits, 32-bits, 64-bits, 128-bits, 256-bits, and 512-bits. In some embodiments, the Montgomery multiplication instruction may be operative to indicate a size and/or may be suitable for operands sizes that range from at least 1024-bits to 2048-bits, or from 1024-bits to 8192-bits, or from 256-bits to 16384-bits, to name just a few examples.

The scalar registers 456 and the vector registers 458 may represent on-die (or on integrated circuit) storage locations that are operative to store data. The vector registers may be operative to store packed data, vector data, or Single instruction, multiple data (SIMD) data. The scalar and vector registers may represent architecturally-visible or architectural registers that are visible to software and/or a programmer and/or are the registers indicated by instructions of the instruction set of the processor to identify operands. These architectural registers are contrasted to other non-architectural registers in a given microarchitecture (e.g., temporary registers, reorder buffers, etc.). The registers may be implemented in different ways in different microarchitectures and are not limited to any particular type of design. Examples of suitable types of registers include, but are not limited to, dedicated physical registers, dynamically allocated physical registers using register renaming, and combinations thereof.

One specific example embodiment of a suitable Montgomery multiplication instruction, for a 64-bit word size architecture or mode, named MONTMUL64, is illustrated in the pseudocode below.

MONTMUL64 {
//OPERANDS:
SrcDst R1//64-bit register R1 has address of memory location for X, Y, N, and result
Src2 R2//64-bit register R2 has smaller Montgomery multiplication constant (M)
imm8//imm8 indicates a number of 64-bit words
//OPERATION:
{X∥Y∥N}=SrcDst//access X, Y, N from memory, optionally raise mem access fault
M=src2//access M from Src2
s=imm8+1//number of 64-bit words in modulus (e.g., size N=s*64-bits)
raise fault if N isn't odd//this is optional
Initialize A=0
For i from 0 to s−1

$$ui=(a[0]+x[i]*y[0])*M \bmod(2^{64})$$

$$A=(A+x[i]*Y+ui*N)/(2^{64})$$

If (A≥N) then A=A−N
SrcDst=A//store A over X or Y (e.g., now memory has {A∥Y∥N})}

MONTMUL64 indicates a register R1 (e.g., a 64-bit general-purpose register) used to store memory address information for a source/destination storage location in memory that is initially used as a source of a first integer (X), a second integer (Y), and a modulus (N) and that is later used to store the Montgomery multiplication product. The Montgomery multiplication product is written in the SrcDst over one of the first and second integers not the modulus. This may help to improve efficiency from an algorithmic perspective by allowing the algorithm to only copy in one new operand each iteration of a loop. MONTMUL64 also indicates a register R2 (e.g., a 64-bit general-purpose register) used to store a smaller Montgomery multiplication constant (M). MONTMUL64 has an immediate, in this case an 8-bit immediate (imm8), which stores a value representing a count or number of 64-bit words corresponding to the modulus (N). This imm8 may allow the size of the modulus to be indicated over a range up to 16,384 bits.

Another analogous specific example embodiment of a suitable Montgomery multiplication instruction, for a 32-bit word size architecture or mode, named MONTMUL32, is illustrated in the pseudocode below.

MONTMUL32 {
//OPERANDS:
SrcDst R1//32-bit register R1 has address of memory location for X, Y, N, and result
Src2 R2//32-bit register R2 has smaller Montgomery multiplication constant (M)
imm8//imm8 indicates a number of 32-bit words
//OPERATION:
{X∥Y∥N}=SrcDst//access X, Y, N from memory, optionally raise mem access fault
M=src2//access M from Src2
s=imm8+1//number of 32-bit words in modulus (e.g., size N=s*32-bits)
raise fault if N isn't odd//this is optional
Initialize A=0
For i from 0 to s−1

$$ui=(a[0]+x[i]*y[0])*M \bmod(2^{32})$$

$$A=(A+x[i]*Y+ui*N)/(2^{32})$$

If (A≥N) then A=A−N
SrcDst=A//store A over X or Y (e.g., now memory has {A∥Y∥N})}

MONTMUL32 is analogous to MONTMUL64 and the discussion above for MONTMUL64 generally applies, except for the 32-bit instead of 64-bit word size. Instead of 64-bit general-purpose registers, 32-bit general-purpose registers may be used for R1 and R2. The smaller Montgomery multiplication constant (M) is also based on a 32-bit word size (e.g., −N$^{-1}$ mod ($2^{32}$)), as discussed above. Each of a[i], x[i], and y[i] correspond to the i-th 32-bit word in their respective operands. The imm8 stores a value representing a count or number of 32-bit words corresponding to the modulus (N).

It is to be appreciated that MONTMUL32 and MONTMUL64 are just two illustrative example embodiments, and that many variations are also contemplated. For example, in other embodiments, the smaller Montgomery multiplication constant (M) may either be stored in the memory location with one or more of the X, Y, and N (e.g., as {X∥Y∥N∥M}), or else it may be generated as one of the operations of performing the instruction. One advantage of calculating M as part of the instruction is that it may allow the same instruction to be agnostic to the word size of the underlying architecture such that the same instruction (e.g., the same opcode) could be used for both 32-bit and 64-bit word size processor architectures or modes of operation. As another example, in other embodiments, a fixed size may be assumed by the instruction for the modulus, in which case the immediate may optionally be omitted. As yet another example, in other embodiments, instead of using the SrcDst, a separate storage location may optionally be used to store the Montgomery multiplication product. Also, the X, Y, and N may optionally be stored in various other orders. More generally, vector registers or other storage locations may optionally be used for one or more of X, Y, N, and M operands.

Referring to the pseudocode 353, one of the most computationally intensive and/or time consuming operations involved in performing the Montgomery multiplication is calculating the Montgomery multiplication accumulated partial product (A). This operation is performed once during each iteration of the loop over the number of word sized portions of the modulus. In addition, there may be a relatively large number of such iterations. For example, there may be sixteen iterations in the case of a 1024-bit modulus and 64-bit words, thirty-two iterations in the case of a 2048-bit modulus, and so on. In some embodiments, a Montgomery multiplication accumulate partial product instruction 508 may optionally be included in an instruction set of a processor in order to help perform this operation.

Figure 5:
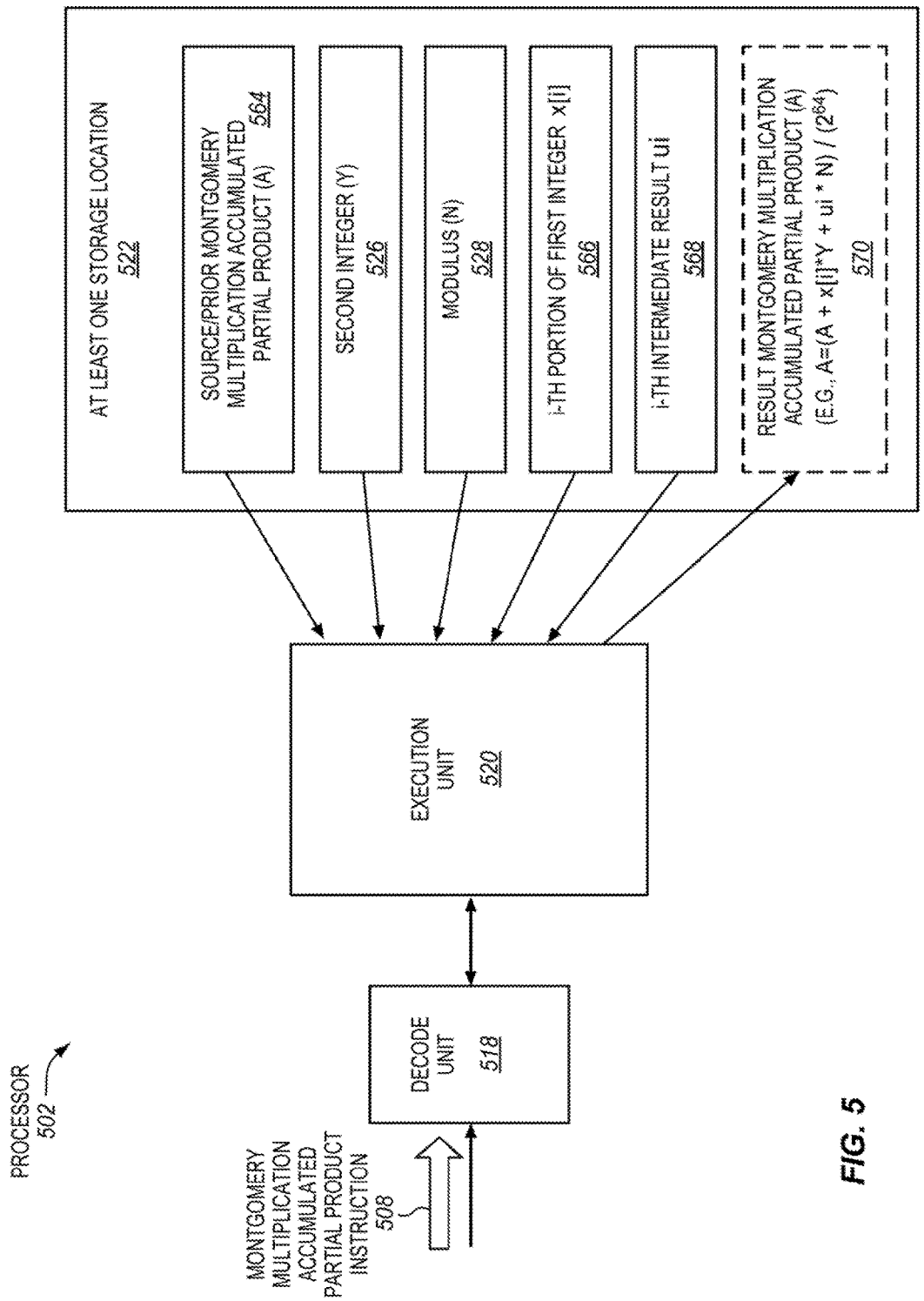
FIG. 5 is a block diagram of an embodiment of a processor that is operative to perform an embodiment of a Montgomery multiplication accumulate partial product instruction.

FIG. 5 is a block diagram of an embodiment of a processor 502 that is operative to perform an embodiment of a Montgomery multiplication accumulate partial product instruction 508. The processor 502 may be the same as, similar to, or different than, the processor 202 of FIG. 2.

The processor includes a decode unit 518 that is operative to receive and decode the Montgomery multiplication accumulate partial product instruction 508. Aside from the aspect of being able to decode the instruction 508, in addition to or instead of the instruction 206, the decoder may optionally be similar to or the same as the decoder unit 218 of FIG. 2.

In some embodiments, the Montgomery multiplication accumulate partial product instruction 508 may specify (e.g., explicitly specify) or otherwise indicate (e.g., implicitly indicate) at least one storage location 522 that is to store a source, prior Montgomery multiplication accumulated partial product (A) 564, a second integer (Y) 526, and a modulus (N) 528. The source Montgomery multiplication accumulated partial product (A) may represent the accumulated partial product computed by a prior Montgomery multiplication accumulate partial product instruction 508 in an immediately prior iteration to the current i-th iteration of the loop. The second integer (Y) and the modulus (N) may optionally be similar to or the same as those described elsewhere herein.

The at least one storage location 522 may also store an i-th portion of a first integer x[i] 566. By way of example, this may represent the i-th one of the 64-bit portions (e.g., x[0], x[1], etc.) of the first integer X 324 as shown in FIG. 3 for the immediately prior iteration of the loop.

The at least one storage location 522 may also store an i-th intermediate result of prior calculations ui 568 for the i-th iteration of the loop of the Montgomery multiplication. The i-th intermediate result of prior calculations ui may be calculated according to and/or may be equivalent to an evaluation of the following Equation 5:

$$ui=(a[0]+x[i]*y[0])*M \bmod(2^{64}) \qquad \text{Equation 5}$$

Recall that this equation also appears in the pseudocode 353. Without limitation, the i-th intermediate result of prior calculations ui may have been calculated by one or more prior instructions in program order as part of an algorithm that employs the Montgomery multiplication accumulate partial product instruction 508.

Various different types of storage locations may optionally be used for the at least one storage location 522. Examples of suitable storage locations include, but are not limited to, one or more storage locations in memory, one or more registers of the processor (e.g., scalar and/or vector registers), one or more dedicated storage locations of the processor, and the like, and various combinations thereof. These storage locations may be indicated by the instruction in the various ways disclosed elsewhere herein.

Referring again to FIG. 5, an execution unit 520 is coupled with the decode unit 518. The execution unit is also coupled with the at least one storage location 522 to receive the source Montgomery multiplication accumulated partial product (A), the second integer (Y), the modulus (N), the i-th portion of a first integer x[i], and the i-th intermediate result of prior calculations ui. Each of these may represent a source operand of the Montgomery multiplication accumulate partial product instruction 508. The execution unit may be operative in response to and/or due to the Montgomery multiplication instruction (e.g., in response to one or more instructions or control signals decoded from the instruction and/or in response to the instruction being decoded and/or in response to the instruction being provided to a decoder) to generate and store a result, updated Montgomery multiplication accumulated partial product (A) 570, for the i-th iteration of the Montgomery multiplication, in a destination storage location indicated by the Montgomery multiplication instruction.

In some embodiments, the result, updated Montgomery multiplication accumulated partial product (A) may be calculated according to and/or may be equivalent to an evaluation of the following Equation 6:

$$A=(A+x[i]*Y+ui*N)/(2^{64}) \qquad \text{Equation 6}$$

Note that each operation like x[i]*Y may involves multiple 64-bit multiply-accumulate operations. For example, if Y is a 2048-bit operand there may be thirty-two such operations.

The execution unit and/or the processor may include specific or particular logic (e.g., transistors, integrated circuitry, or other hardware potentially combined with firmware (e.g., instructions stored in non-volatile memory) that is operative to perform the Montgomery multiplication accumulate partial product instruction 508 and/or store the result, updated Montgomery multiplication accumulated partial product (A) 570 in response to and/or as a result of the Montgomery multiplication accumulate partial product instruction 508. In some embodiments, the execution unit may include one or more input structures (e.g., a port, interconnect, or interface to receive the source operands, logic operative to perform a Montgomery multiplication accumulated partial product operation coupled therewith to receive and process the source operands and generate the result, updated Montgomery multiplication accumulated partial product (A), and one or more output structures (e.g., a port, interconnect, or interface) coupled therewith to output the result, updated Montgomery multiplication accumulated partial product (A). In some embodiments, the logic operative to perform a Montgomery multiplication accumulated partial product operation may include an arithmetic logic unit (ALU), optionally including multiply-add logic and shift logic, and Montgomery multiplication accumulated partial product operation control logic to control the ALU to perform the operation. By way of example, the control logic may include a microcode engine, a microsequence state machine, or the like, or a combination thereof. In some embodiments, the execution unit 520 may optionally include logic similar to that shown and described for FIG. 3 except that the control logic 452 would be operative to control the Montgomery multiplication accumulated partial product operation instead of the full Montgomery multiplication operation.

In some embodiments, a source, prior Montgomery multiplication accumulated partial product (A), a second integer (Y), and a modulus (N) may optionally each be stored in one or more storage locations in a memory, although this is not required. A Montgomery multiplication accumulate partial product instruction may be operative to indicate the storage location in the memory as described elsewhere herein. For example, in one particular embodiment, each of these source operands may optionally be stored contiguously or adjacent to one another in the same single storage location in memory, although the scope of the invention is not so limited. These operands may be stored in various different orders or arrangements, such as, for example, AYN, NAY, NYA, YAN, etc. Alternatively, two or more storage locations in the memory may optionally be used for these source operands. Storing the operands in one or more storage locations in the memory may tend to be beneficial especially when the operands are wider than the widest vector registers of the processor. In other embodiments, vector registers of the processor, or other storage locations, may optionally be used for one or more of these source operands. Especially when the processor has wide vector registers that are at least as wide as the width in bits of the operands (e.g., the modulus (N)), the use of such vector register may tend to be beneficial.

In some embodiments, the i-th portion of the first integer x[i] may optionally be stored in a scalar register (e.g., a 32-bit or 64-bit general-purpose register) that may be explicitly specified by or implicitly indicated by the Montgomery multiplication accumulate partial product instruction. Similarly, in some embodiments, the i-th intermediate result of prior calculations ui may optionally be stored in a scalar register (e.g., a 32-bit or 64-bit general-purpose register) that may be explicitly specified by or implicitly indicated by the Montgomery multiplication accumulate partial product instruction. These parameters are relatively small and tend to be well suited for storage in registers of the processor. As another option, in other embodiments, either one or both of these source operands may optionally be stored in a storage location in the memory or another storage location. In some embodiments, either one or both of these source operands may optionally be stored in a memory location with one or more or optionally all of the source, prior Montgomery multiplication accumulated partial product (A), the second integer (Y), and the modulus (N).

One specific example embodiment of a suitable Montgomery multiplication accumulate partial product instruction, for a 64-bit word size architecture or mode, named ACCMONTMUL64, is illustrated in the pseudocode below.

ACCMONTMUL64 {
//OPERANDS:
SrcDst R1//64-bit register R1 has address of memory location for A, Y, N, and result
Src2 R2//64-bit register R2 has x[i]
Src3 R3//64-bit register R3 has ui
imm8//imm8 indicates a number of 64-bit words
//OPERATION:

{A||Y||N}=SrcDst//access A, Y, N from memory, optionally raise memory access fault
raise fault if N isn't odd//this is optional
s=imm8+1//number of 64-bit words in modulus (e.g., size N=s*64-bits)

$$A=(A+x[i]*Y+ui*N)/(2^{64})$$

SrcDst=A//store result A over source A (e.g., memory has {A||Y||N})}

ACCMONTMUL64 indicates a register R1 (e.g., a 64-bit general-purpose register) used to store memory address information for a source/destination storage location in memory that is initially used for source/prior Montgomery multiplication accumulated partial product (A), a second integer (Y), and a modulus (N) and that is later used to store the result, updated Montgomery multiplication accumulated partial product (A). The result, updated partial product (A) is written in the SrcDst over the source/prior partial product (A). ACCMONTMUL64 also indicates a register R2 (e.g., a 64-bit general-purpose register) used to store the i-th 64-bit word of the first integer x[i] and a third register R3 (e.g., a 64-bit general-purpose register) used to store the i-th intermediate result of prior calculations ui.

The immediate to provide the number of 64-bit words is used implicitly to compute the terms like ui*N, where ui is a single 64-bit operand, while N includes the number of 64-bit portions. Iterative 64-bit multiplications with the various portions of N may be performed with the ui parameter. Likewise, iterative multiplications may be performed over the number of 64-bit portions of Y to perform the x[i]*Y.

Another analogous specific example embodiment of a suitable Montgomery multiplication instruction, for a 32-bit word size architecture or mode, named ACCMONTMUL32, is illustrated in the pseudocode below.

ACCMONTMUL32{
//OPERANDS:
SrcDst R1//32-bit register R1 has address of memory location for A, Y, N, and result
Src2 R2//32-bit register R2 has x[i]
Src3 R3//32-bit register R3 has ui
imm8//imm8 indicates a number of 32-bit words
//OPERATION:
{A||Y||N}=SrcDst//access A, Y, N from memory, optionally raise memory access fault
raise fault if N isn't odd//this is optional
s=imm8+1//number of 32-bit words in modulus (e.g., size N=s*32-bits)

$$A=(A+x[i]*Y+ui*N)/(2^{32})$$

SrcDst=A//store result A over source A (e.g., memory has {A||Y||N})}

ACCMONTMUL32 is analogous to ACCMONTMUL64 and the discussion above for ACCMONTMUL64 generally applies, except for the 32-bit instead of 64-bit word size. Instead of 64-bit general-purpose registers, 32-bit general-purpose registers may be used for R1 and R2.

It is to be appreciated that ACCMONTMUL632 and ACCMONTMUL64 are just two illustrative example embodiments, and that many variations are also contemplated. For example, in other embodiments, either one or both of x[i] and ui may optionally be stored in the memory location with one or more of the A, Y, and N (e.g., as {A||Y||N||ui||x[i]}). As another example, in other embodiments, instead of using the SrcDst, a separate storage location may optionally be used to store the result, updated Montgomery multiplication accumulated partial product (A). Also, the X, Y, and N may optionally be stored in various other orders. More generally, vector registers or other storage locations may optionally be used for one or more of A, Y, N, x[i], and ui operands.

In some embodiments, instead of the Montgomery multiplication instruction and/or the Montgomery multiplication accumulate partial product instruction being provided directly to the decode unit, an instruction emulator, translator, morpher, interpreter, or other instruction conversion module may optionally be used. Various types of instruction conversion modules may be implemented in software, hardware, firmware, or a combination thereof. In some embodiments, the instruction conversion module may be located outside the processor, such as, for example, on a separate die and/or in a memory (e.g., as a static, dynamic, or runtime emulation module). In other embodiments, the instruction conversion module may optionally be located on the processor. By way of example, the instruction conversion module may receive the Montgomery multiplication instruction, or Montgomery multiplication accumulate partial product instruction, which may be of a first instruction set, and may emulate, translate, morph, interpret, or otherwise convert it into one or more corresponding intermediate instructions or control signals, which may be of a second different instruction set. The one or more intermediate instructions or control signals of the second instruction set may be provided to a decode unit (e.g., decode unit 218), which may decode them into one or more lower-level instructions or control signals executable by native hardware of the processor (e.g., one or more execution units).

Figure 6:
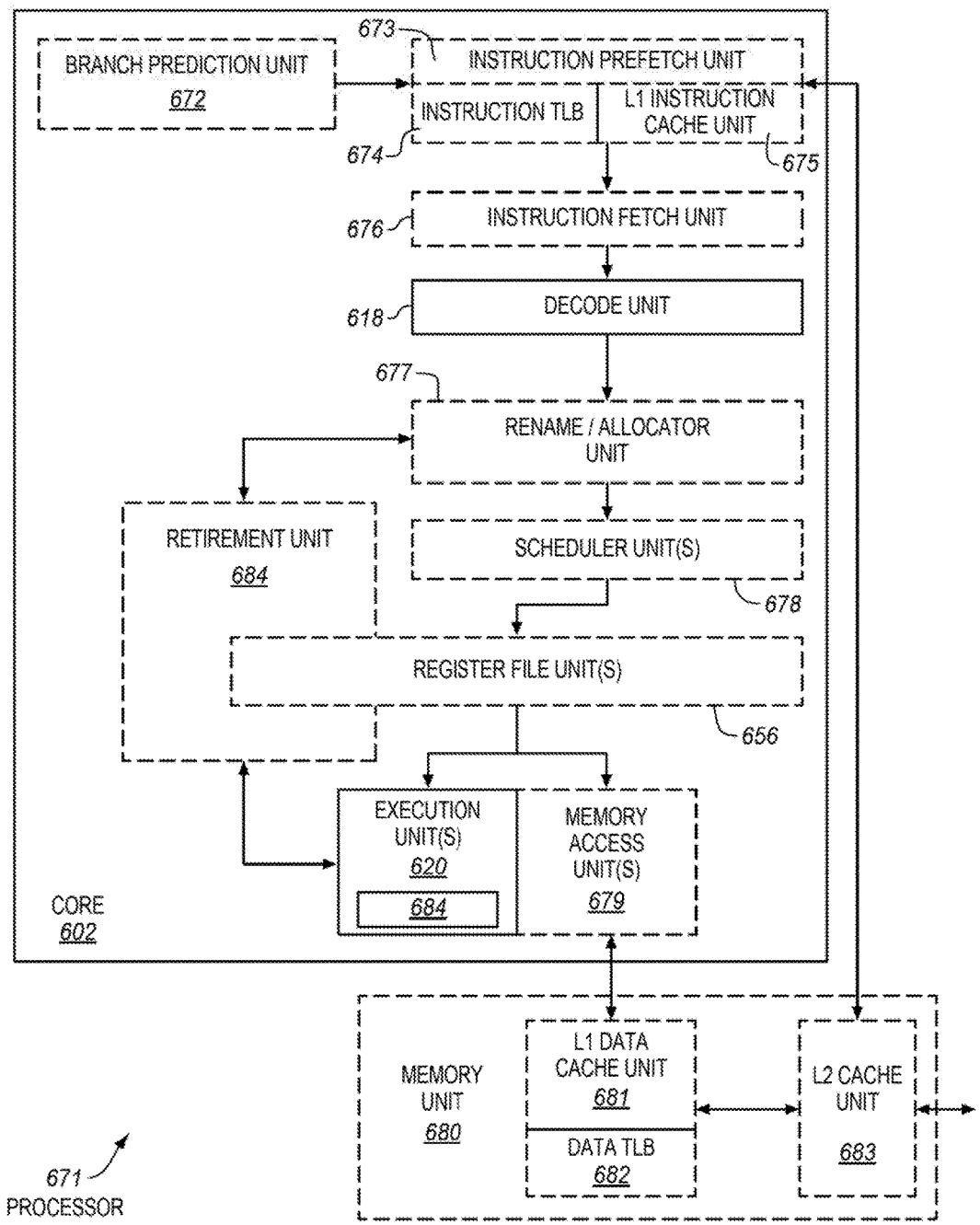
FIG. 6 is a block diagram of a detailed example embodiment of a processor that is suitable for implementing embodiments of the invention.

FIG. 6 is a block diagram of a detailed example embodiment of a processor 671 that is suitable for implementing embodiments of the invention. The processor includes at least one core 602 that is able to perform an embodiment of an instruction that is useful to support or accelerate Montgomery multiplication (e.g., Montgomery multiplication instruction 206 and/or Montgomery multiplication accumulate partial product instruction 508). The core may optionally include a branch prediction unit 672 that is operative to predict branches in program flow. The branch prediction unit is coupled with an optional instruction prefetch unit 673. The instruction prefetch unit may be operative to prefetch or otherwise receive instructions, including the instruction to support Montgomery multiplication, from memory (e.g., through an optional memory unit 680). An optional level 1 (L1) instruction cache unit 675, and an optional instruction translation lookaside buffer (TLB) 674, are coupled with the instruction prefetch unit. The L1 instruction cache unit may be operative to coherently cache or otherwise store instructions, including the instruction to support Montgomery multiplication. The instruction TLB may be operative to store logical to physical address translations for instructions including the instruction to support Montgomery multiplication. The processor also includes an optional L1 data cache unit 681 to cache or store data corresponding to operands of instructions including in some embodiments the instruction to support Montgomery multiplication. The processor also optionally includes a level 2 (L2) cache unit 681 and an optional data TLB 682. The L2 cache unit may be operative to coherently cache data and instructions, including the instruction to support Montgomery multiplication. The L2 cache unit may be dedicated to the core, or shared by the core and other optional cores (not shown). An optional instruction fetch unit 676 is coupled with the L1 instruction cache unit, the L2 cache unit, and a decode unit 618. The instruction fetch unit may fetch or otherwise receive instructions, including the Montgomery multiplication instruction (e.g., from the L1 instruction cache unit or the L2 cache unit), and may provide the instructions to the decode unit. The decode unit may decode the instructions, including the instruction to support Montgomery multiplication, as described elsewhere herein. The decode unit may optionally be similar to or the same as those disclosed elsewhere herein (e.g., decode unit 218 and/or decode unit 518).

The processor also includes one or more register file units 656. The register file unit(s) may include one or more sets of registers of various different possible types, such as, for example, vector registers, scalar or general-purpose registers, a status or flags register, control or configuration registers, and combinations thereof. In an embodiment where the core optionally supports register renaming, the core may also optionally include a register rename/allocator unit 677 coupled with the register file unit(s) to allocate resources and perform register renaming on registers (e.g., in some embodiments registers used by the instruction to support Montgomery multiplication). In some embodiments that optionally support out-of-order (OoO) execution, which is not required, the core may optionally include one or more scheduler units 678 coupled with the decode unit, the rename/allocator unit, and one or more execution units 620. The scheduler unit(s) may schedule one or more operations associated with decoded instructions, including one or more operations decoded from the instruction to support Montgomery multiplication, for execution on the execution units. The core may optionally have multiple different types of execution units, such as, for example integer execution units, floating point execution units, vector execution units, one or more memory access units 679, and the like. In some embodiments, one or more of the execution units include logic to support Montgomery multiplication 684 (e.g., logic to perform instruction 206 and/or instruction 508). For OoO execution, the core may optionally include a retirement or commit unit 684 coupled with the execution units, the register file unit(s), and the rename/allocator unit. The retirement or commit unit may be operative to retire or commit instructions.

It is to be appreciated that this is just one illustrate example of a suitable processor. In alternate embodiments, the processor may include either fewer or more components which may be coupled or arranged in similar or different ways to that shown in various ways sufficient to allow them to operate as intended. Examples of other components that may optionally be included one or more reorder buffers (ROBs), an address generation unit, a debug unit, a performance monitor unit, a power management unit. Moreover, the processor may optionally have multiple cores (e.g. at least two, at least four, at least eight, at least twenty four, at least forty eight, etc.). The cores may either be homogeneous or heterogeneous.

The processors disclosed herein may be included in different types of electronic devices. Examples of suitable types of electronic devices include desktop computers, laptop computers, notebook computers, and like computer systems. Such computer systems typically include a memory, such as, for example, a dynamic random access memory and/or a flash memory, and non-volatile data storage, such as, for example, a hard disk drive. Commonly, such computer systems also have a network controller to provide a network connection, an audio controller to provide audio input and/or output, and a monitor or display (e.g., a liquid crystal display), and one or more input/output devices (e.g., a keyboard and/or a mouse and/or a trackpad). Often, such computer systems have one or more serial expansion ports (e.g., a universal serial bus (USB)), for example, to allow external peripheral devices to be attached. Some such computer systems also have a video capture device. In some cases, especially in the case of portable computer systems, they may have a wireless transceiver. Other examples of suitable computer systems include, but are not limited to, smartphones, set top boxes, and the like.

Still other examples of suitable computer systems or electronic devices include, but are not limited to, servers (e.g., web servers, cloud servers, and media servers), network elements (e.g., switches and routers), storage servers, systems, and appliances, security appliances, or the like. To further illustrate certain concepts, a detailed illustrative example embodiment of a possible computer system suitable for such embodiments will be shown and described in conjunction with FIG. 7.

Figure 7:
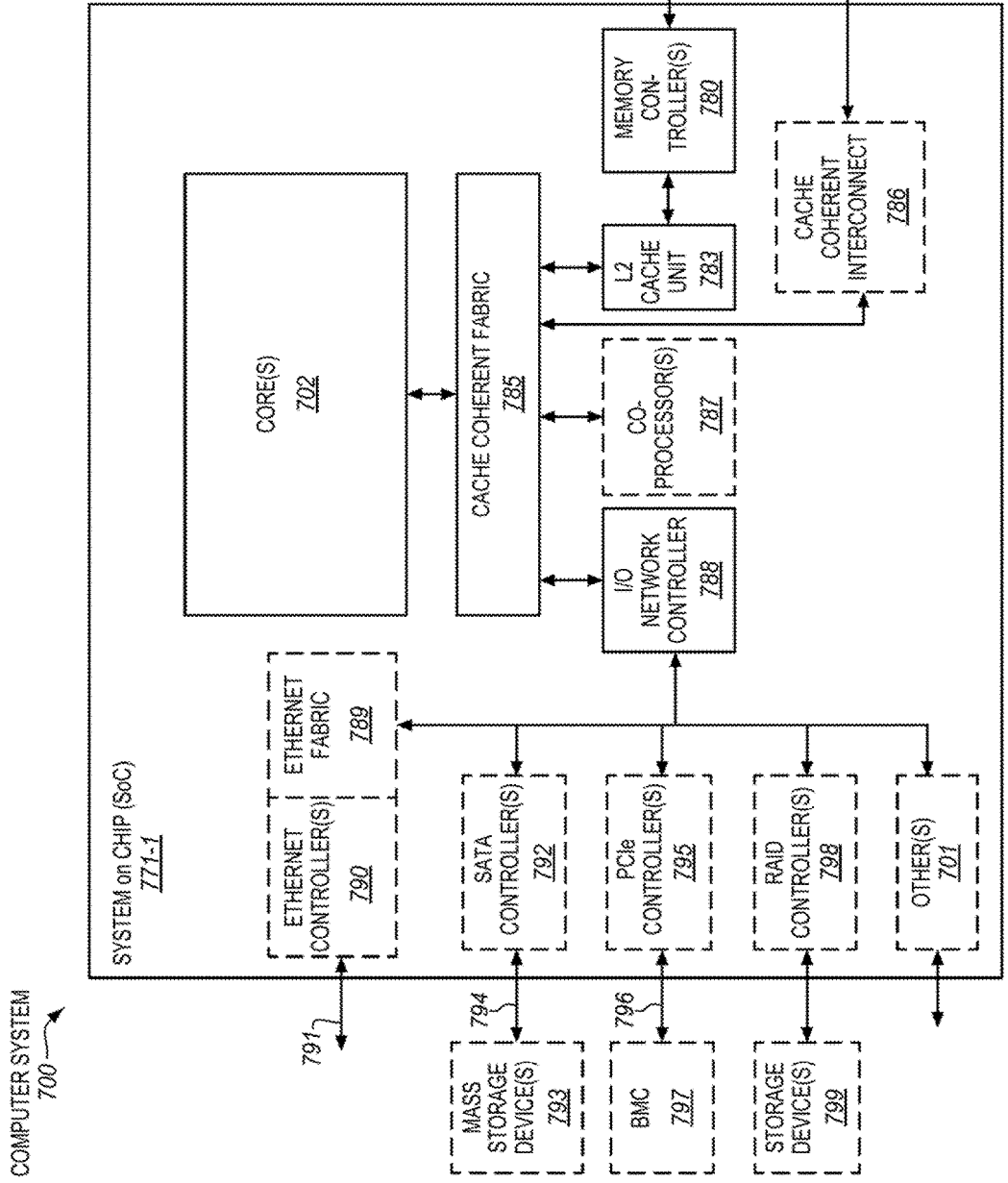
FIG. 7 is a block diagram of a detailed illustrative example embodiment of a computer system that includes a detailed illustrative example embodiment of a system on chip (SoC) that includes one or more cores that have an instruction set that includes an instruction to support Montgomery multiplication.

FIG. 7 is a block diagram of a detailed illustrative example embodiment of a computer system 700 that includes a detailed illustrative example embodiment of a system on chip (SoC) 771-1 that includes one or more cores 702 that have an instruction set that includes an instruction to support Montgomery multiplication (e.g., instruction 206 and/or instruction 508). Other embodiments pertain to the SoC alone, before it is included in the computer system. All components of the SoC may be integrated or disposed on the same chip, semiconductor die, or integrated circuit.

The SoC 771-1 includes the one or more cores 702. In various embodiments, there may be a single core, at least two cores, at least four cores, at least eight cores, at least twenty-four cores, at least forty-eight cores, at least fifty six cores, or some other number of cores. In some embodiments, at least one of the cores may include a decoder and an execution unit to decode and perform an instruction to support Montgomery multiplication (e.g., instruction 206 and/or instruction 508). Each of the cores may optionally be the same as, similar to, or different than, the processor 202 and/or the processor 402 and/or the processor 502 and/or the core 602.

The one or more cores are coupled with a cache coherent fabric 785. A shared level two (L2) cache 783 is also coupled with the cache coherent fabric. In some embodiments, each of the cores may have an integrated level one (L1) cache (not shown). The shared L2 cache may be shared by (e.g., used to store data for) each of the one or more cores.

One or more memory controllers 780 of the SoC are coupled with the one or more cores through the cache coherent fabric and the L2 cache. In some embodiments, the one or more memory controllers may optionally include one or more double data rate synchronous dynamic random-access memory (DDR SDRAM) memory controllers (e.g., a DDR3 SDRAM compatible memory controller and/or a DDR4 SDRAM compatible memory controller). At least one memory 760 of the computer system is coupled with the one or more memory controllers. In some embodiments, the at least one memory may include at least one DDR SDRAM, such as a DDR3 SDRAM and/or a DDR4 SDRAM (e.g., dual in-line memory modules (DIMMs)). Alternatively, other types of memory and memory controllers may optionally be used.

An optional cache coherent interconnect 786 of the SoC may be coupled with the cache coherent fabric. In some embodiments, a second SoC 771-2 of the computer system may optionally be coupled with the cache coherent interconnect 786. The second SoC may optionally be similar to or the same as the SoC 771-1. The cache coherent interconnect and the cache coherent fabric may be operative to maintain cache coherency between caches of the SoCs.

In some embodiments, one or more coprocessors 787 may optionally be coupled with the one or more cores through the cache coherent fabric. Examples of suitable coprocessors for various different embodiments include, but are not limited to, a security coprocessor, a cryptographic coprocessor (e.g., a cryptography engine), a storage coprocessor, a network coprocessor, a packet coprocessor (e.g., a packet processing engine or a deep packet inspection accelerator), a data compression and/or decompression coprocessor, a regular-expression matching (regex) engine, and combinations thereof. In some embodiments, the security coprocessor and/or the cryptographic coprocessor may optionally be able to perform at least one of the instructions to support Montgomery multiplication as disclosed herein, although this is not required.

An input/output (I/O) network controller 788 may be coupled with the one or more cores through the cache coherent fabric. As shown, the I/O network controller may coupled with various other components or devices and may be operative to couple each of these components or devices with the one or more cores through the intervening cache coherent fabric.

In some embodiments, an optional Ethernet fabric 789 (e.g., an Ethernet switch) and one or more optional Ethernet media access controllers (MACs) or other controllers 790 may optionally be coupled with the I/O network controller. In such embodiments, one or more Ethernet cables 791 of the computer system may be coupled the one or more Ethernet MACs or other controllers. In various embodiments, the one or more Ethernet MACs or other controllers may be operative to support 10 gigabit Ethernet, 40 gigabit Ethernet, 100 gigabit Ethernet, or a combination thereof. The Ethernet cables may be operative to couple to various storage devices, a network, or the like.

In some embodiments, one or more optional Serial Advanced Technology Attachment (SATA) controllers 792 may optionally be coupled with the I/O network controller. In such embodiments, one or more cables and one or more mass storage devices 793 of the computer system may be coupled the one or more SATA controllers. Examples of suitable mass storage devices include, but are not limited to, one or more hard disk drives, optical drives, solid-state drives, and the like, and combinations thereof.

In some embodiments, one or more optional Peripheral Component Interconnect Express (PCIe) controllers 795 may optionally be coupled with the I/O network controller. In some embodiments, the PCIe controllers may optionally be PCI Express 3.0 Base specification revision 3.0 compliant and/or PCI Express 4.0 compliant. In such embodiments, one or more PCIe buses or other interconnects of the computer system may be coupled with the one or more PCIe controllers. The PCIe interconnects may provide a serial expansion interconnect to allow one or more of various different types of peripheral components or devices of the computer system to be coupled with the one or more PCIe controllers. In some embodiments, an optional baseband management controller (BMC) 797 of the computer system may optionally be coupled with the one or more PCIe controllers. In other embodiments, a BMC may optionally be included on the SoC.

In some embodiments, one or more redundant array of independent disks (RAID) controllers 798 may optionally be coupled with the I/O network controller. In such embodiments, one or more storage devices 799 of the computer system may be coupled the one or more RAID controllers. Examples of suitable storage devices include, but are not limited to, one or more hard disk drives, solid-state drives, a storage array, or a combination.

In some embodiments, one or more other components 701 may optionally be coupled with the I/O network controller. In various embodiments, such other components may optionally include a direct memory access (DMA) controller, a universal serial bus (USB) 3.0 compliant controller, a General-purpose input/output (GPIO) controller, an Inter-Integrated Circuit (I$^2$C) controller, or a combination thereof.

Figure 8:
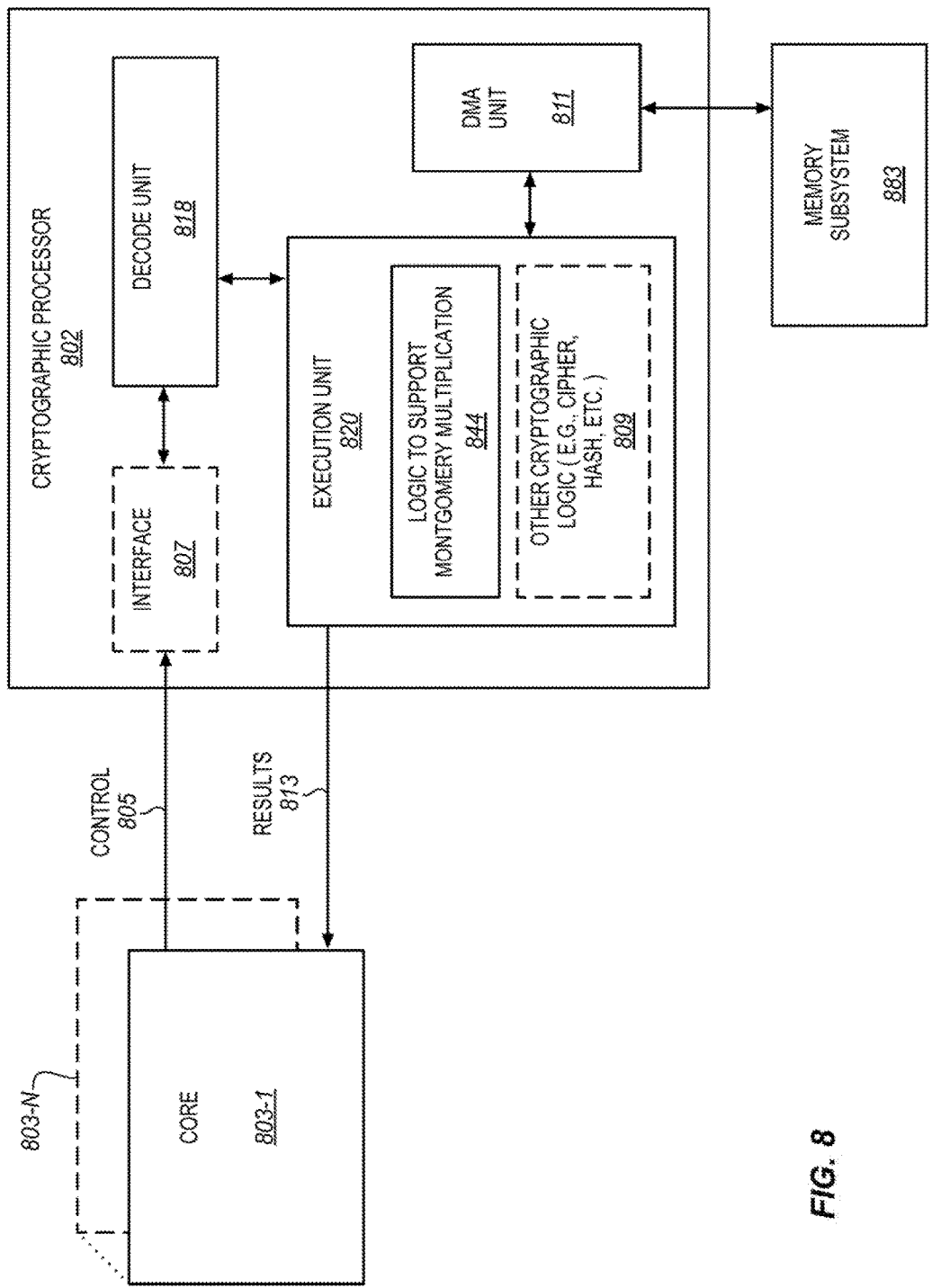
FIG. 8 is a block diagram of an example embodiment of a cryptographic processor to offload performance of an instruction to support Montgomery multiplication from one or more cores.

FIG. 8 is a block diagram of an example embodiment of a cryptographic processor 802 to offload performance of an instruction to support Montgomery multiplication (e.g., instruction 206 and/or instruction 508) from one or more cores 803-1, 803-N. The cryptographic processor is coupled with one or more cores. In some embodiments, if there is more than one core, the cryptographic processor may either be dedicated to a corresponding core or shared by two or more or all of the cores. The cores may either be single threaded or multithreaded. The cryptographic processor may be used as a cryptographic coprocessor, a cryptographic offload engine, or the like, to offload operations associated with performing Montgomery multiplication from one or more of the cores.

A first core 803-1 may provide control 805 (e.g., one or more signals) to the cryptographic processor. The control may broadly represent a request, indication, command, or the like, that the cryptographic processor perform the instruction to support Montgomery multiplication. In some embodiments, this may include providing a signal, value, or the like to an optional interface 807 of the cryptographic processor. By way of example, a value representing a request that the instruction be performed may be stored in a control word queue, control register, or other storage location. In the illustrated embodiment, the interface is part of the cryptographic processor, although it is also possible for a control word queue, other register, or other interface to be stored in memory. Alternatively, the control may include forwarding the instruction to support Montgomery multiplication to the cryptographic processor.

The cryptographic processor includes a decode unit 818. The decode unit may either be operative to decode the forwarded instruction to support Montgomery multiplication or may be operative to inspect or examine the contents of the interface 807 (e.g., a control word queue, control register, etc.) to determine that an operation to support Montgomery multiplication is to be performed. The cryptographic processor also includes an execution unit 820 coupled with the decode unit. In some embodiments, the execution unit includes logic to support Montgomery multiplication (e.g., logic to perform a Montgomery multiplication instruction and/or logic to perform a Montgomery multiplication accumulate partial product instruction). In some embodiments, the execution unit may optionally be similar to or the same as execution unit 220 and/or 520 except possibly for aspects pertaining to it being included in the cryptographic processor. The execution unit may optionally have other cryptographic logic 809, such as, for example, logic to perform one or more cipher (e.g., encryption and/or decryption) algorithms, logic to perform one or more hash algorithms, etc.

The cryptographic processor also includes a direct memory access (DMA) unit 811. The DMA unit may be operative to access data in a memory subsystem 883, such as, for example, from one or more levels of cache, a memory, etc. In some embodiments, the DMA unit may access source operands from the memory subsystem and store result operands to the memory subsystem on behalf of the execution unit. In some embodiments, the DMA unit may be configured or controlled by the one or more cores for which the operations are being performed (e.g., as part of the control 805). Effectively, the cryptographic processor may determine and provide results 813 for the requesting core. In some cases, these results may not actually be transmitted or delivered to the core, but rather may be stored in a location accessible to the core (e.g., the memory subsystem 883), for example.

The cryptographic processor 802 may be relatively closer to the cores or relatively farther from the cores, in various different embodiments. In some embodiments, the cryptographic processor may optionally be in an uncore portion of a processor close to the one or more cores. In other embodiments, the cryptographic processor may optionally be on a SoC with the cores but may be farther from the cores. In still other embodiments, the cryptographic processor may optionally be on a separate chip than the cores. The Montgomery multiplication accumulate partial product instructions disclosed herein (e.g., instruction 508) generally perform only a subset of the operations of the Montgomery multiplication instructions disclosed herein (e.g., instruction 206) and are generally expected to have shorter execution latencies. These shorter latencies may tend to make it relatively more beneficial for these instructions to be performed within a core or relatively close to the core (e.g., in an uncore on the same chip) in order to help reduce the latency to access the hardware data-path. The Montgomery multiplication instructions may also optionally be performed within a core or relatively close to the core (e.g., in an uncore on the same chip), but may also tend to be more amenable to being offloaded to a coprocessor, offload engine, or the like, which may either be relatively farther away on the same SoC or on a separate chip. However, the scope of the invention is not limited to any known placement of such logic.

Components, features, and details described for any of FIGS. 3, 4, 6, 7, and 8 may also optionally apply to FIG. 2. Components, features, and details described for any of FIGS. 6, 7, and 8 may also optionally apply to FIG. 5. Components, features, and details described for any of the processors disclosed herein (e.g., processor 202 and/or processor 502) may optionally apply to any of the methods disclosed herein, which in embodiments may optionally be performed by and/or with such processors. Any of the processors described herein (e.g., processor 202 and/or processor 502) in embodiments may optionally be included in any of the systems disclosed herein (e.g., computer system 700, a desktop computer, etc.).

In the claims, processor components disclosed herein may be said to "be to," "be operative to", "be configured to," "be capable of," "be able to," perform an operation, or the like. For example, a decoder may "be to" decode an instruction, an execution unit may "be to" store a result, etc. It is to be understood that these expressions do not imply that the processor components are in operation or use, but rather refer to what the processor components can do when they are in operation, but in the apparatus claims these processor components are not in operation.

In the description and claims, the terms "coupled" and/or "connected," along with their derivatives, may have be used. These terms are not intended as synonyms for each other. Rather, in embodiments, "connected" may be used to indicate that two or more elements are in direct physical and/or electrical contact with each other. "Coupled" may mean that two or more elements are in direct physical and/or electrical contact with each other. However, "coupled" may also mean that two or more elements are not in direct contact with each other, but yet still co-operate or interact with each other. For example, an execution unit may be coupled with a register and/or a decode unit through one or more intervening components. In the figures, arrows are used to show connections and couplings.

The term "and/or" may have been used. As used herein, the term "and/or" means one or the other or both (e.g., A and/or B means A or B or both A and B).

In the description above, specific details have been set forth in order to provide a thorough understanding of the embodiments. However, other embodiments may be practiced without some of these specific details. The scope of the invention is not to be determined by the specific examples provided above, but only by the claims below. In other instances, well-known circuits, structures, devices, and operations have been shown in block diagram form and/or without detail in order to avoid obscuring the understanding of the description. Where considered appropriate, reference numerals, or terminal portions of reference numerals, have been repeated among the figures to indicate corresponding or analogous elements, which may optionally have similar or the same characteristics, unless specified or clearly apparent otherwise.

Certain operations may be performed by hardware components, or may be embodied in machine-executable or circuit-executable instructions, that may be used to cause and/or result in a machine, circuit, or hardware component (e.g., a processor, portion of a processor, circuit, etc.) programmed with the instructions performing the operations. The operations may also optionally be performed by a combination of hardware and software. A processor, machine, circuit, or hardware may include specific or particular circuitry or other logic (e.g., hardware potentially combined with firmware and/or software) is operative to execute and/or process the instruction and store a result in response to the instruction.

Some embodiments include an article of manufacture (e.g., a computer program product) that includes a machine-readable medium. The medium may include a mechanism that provides, for example stores, information in a form that is readable by the machine. The machine-readable medium may provide, or have stored thereon, an instruction or sequence of instructions, that if and/or when executed by a machine are operative to cause the machine to perform and/or result in the machine performing one or operations, methods, or techniques disclosed herein.

In some embodiments, the machine-readable medium may include a tangible and/or non-transitory machine-readable storage medium. For example, the non-transitory machine-readable storage medium may include a floppy diskette, an optical storage medium, an optical disk, an optical data storage device, a CD-ROM, a magnetic disk, a magneto-optical disk, a read only memory (ROM), a programmable ROM (PROM), an erasable-and-programmable ROM (EPROM), an electrically-erasable-and-programmable ROM (EEPROM), a random access memory (RAM), a static-RAM (SRAM), a dynamic-RAM (DRAM), a Flash memory, a phase-change memory, a phase-change data storage material, a non-volatile memory, a non-volatile data storage device, a non-transitory memory, a non-transitory data storage device, or the like. The non-transitory machine-readable storage medium does not consist of a transitory propagated signal. In some embodiments, the storage medium may include a tangible medium that includes solid-state matter or material, such as, for example, a semiconductor material, a phase change material, a magnetic solid material, a solid data storage material, etc. Alternatively, a non-tangible transitory computer-readable transmission media, such as, for example, an electrical, optical, acoustical or other form of propagated signals—such as carrier waves, infrared signals, and digital signals, may optionally be used.

Examples of suitable machines include, but are not limited to, a general-purpose processor, a special-purpose processor, a digital logic circuit, an integrated circuit, or the like. Still other examples of suitable machines include a computer system or other electronic device that includes a processor, a digital logic circuit, or an integrated circuit. Examples of such computer systems or electronic devices include, but are not limited to, desktop computers, laptop computers, notebook computers, tablet computers, netbooks, smartphones, cellular phones, servers, network devices (e.g., routers and switches.), Mobile Internet devices (MIDs), media players, smart televisions, nettops, set-top boxes, and video game controllers.

Reference throughout this specification to "one embodiment," "an embodiment," "one or more embodiments," "some embodiments," for example, indicates that a particular feature may be included in the practice of the invention but is not necessarily required to be. Similarly, in the description various features are sometimes grouped together in a single embodiment, Figure, or description thereof for the purpose of streamlining the disclosure and aiding in the understanding of various inventive aspects. This method of disclosure, however, is not to be interpreted as reflecting an intention that the invention requires more features than are expressly recited in each claim. Rather, as the following claims reflect, inventive aspects lie in less than all features of a single disclosed embodiment. Thus, the claims following the Detailed Description are hereby expressly incorporated into this Detailed Description, with each claim standing on its own as a separate embodiment of the invention.

EXAMPLE EMBODIMENTS

The following examples pertain to further embodiments. Specifics in the examples may be used anywhere in one or more embodiments.

Example 1 is a processor or other apparatus that includes a plurality of registers, and a decode unit to decode an instruction. The instruction to indicate at least one storage location that is to store a first integer, a second integer, and a modulus. The processor or apparatus also includes an execution unit coupled with the decode unit, and coupled with the plurality of registers. The execution unit, in response to the instruction, is to store a Montgomery multiplication product corresponding to the first integer, the second integer, and the modulus, in a destination storage location.

Example 2 includes the processor or other apparatus of Example 1, in which the decode unit is to decode the instruction that is to indicate a register of the plurality of registers that is to store memory address information to identify a storage location in a memory that is to store at least one of the first integer and the second integer.

Example 3 includes the processor or other apparatus of Example 2, in which the decode unit is to decode the instruction that is to implicitly indicate that the destination storage location, where the Montgomery multiplication product is to be stored, is to be the storage location in the memory. Also, optionally in which the execution unit, in response to the instruction, is to store the Montgomery multiplication product over said one of the first integer and the second integer.

Example 4 includes the processor or other apparatus of any one of Examples 2 to 3, in which the first integer, the second integer, and the modulus are to be stored in the storage location in the memory.

Example 5 includes the processor or other apparatus of any one of Examples 1 to 4, in which the decode unit is to decode the instruction that is to indicate a size of the modulus.

Example 6 includes the processor or other apparatus of Example 5, in which the decode unit is to decode the instruction that is to have an immediate that is to indicate the size of the modulus as a number of fixed bit length segments. Also, optionally in which each fixed bit length segment to have a size in bits that is one of 8-bits, 16-bits, 32-bits, 64-bits, 128-bits, and 256-bits.

Example 7 includes the processor or other apparatus of any one of Examples 5 to 6, in which the decode unit is to decode the instruction that is operative to indicate the size of the modulus as ranging from at least 1024-bits to at least 8192-bits.

Example 8 includes the processor or other apparatus of Example 7, in which the decode unit is to decode the instruction that is operative to indicate the size of the modulus as ranging to at least 16384-bits.

Example 9 includes the processor or other apparatus of any one of Examples 1 to 8, in which the execution unit, in response to the instruction, is to calculate a first Montgomery multiplication constant that is to be equal to a negative inverse of the modulus taken modulo two raised to a power of a word size of the processor. Also, optionally in which the execution unit is to use the first Montgomery multiplication constant to calculate the Montgomery multiplication product.

Example 10 includes the processor or other apparatus of Example 9, in which the execution unit, in response to the instruction, is to attempt to locate the first Montgomery multiplication constant in a storage location of the processor. Also, optionally in which the execution unit is to determine to calculate the first Montgomery multiplication constant when the first Montgomery multiplication constant is not stored in the storage location. Also, optionally in which the execution unit is to store the calculated first Montgomery multiplication constant in the storage location.

Example 11 includes the processor or other apparatus of any one of Examples 9 to 10, in which the decode unit is to decode the instruction that is agnostic to a word size of the processor.

Example 12 includes the processor or other apparatus of any one of Examples 1 to 8, in which the decode unit is to decode the instruction that is to indicate a first Montgomery multiplication constant that is to be equal to a negative inverse of the modulus taken modulo two raised to a power of a word size of the processor.

Example 13 includes the processor or other apparatus of Example 11, in which the decode unit is to decode the instruction that is to indicate a register of the plurality of registers that is to store the first Montgomery multiplication constant.

Example 14 includes the processor or other apparatus of Example 11, in which the decode unit is to decode the instruction that is to indicate a register of the plurality of registers that is to store memory address information to identify a storage location in a memory that is to store the first Montgomery multiplication constant along with at least one of the first integer, the second integer, and the modulus.

Example 15 includes the processor or other apparatus of any one of Examples 12 to 14, in which the decode unit is to decode the instruction that is to have an implicit 64-bit word size. Also, optionally in which the execution unit is to perform the instruction with the 64-bit word size.

Example 16 includes the processor or other apparatus of any one of Examples 12 to 14, in which the decode unit is to decode the instruction that is to have an implicit 32-bit word size. Also, optionally in which the execution unit is to perform the instruction with the 32-bit word size.

Example 17 includes the processor or other apparatus of any one of Examples 1 to 16, in which the execution unit, in response to the instruction, is to store the Montgomery multiplication product that is to be equal to a product of the first and second integers, divided by a second Montgomery multiplication constant, taken modulo the modulus, where the second Montgomery multiplication constant is to be equal to two, raised to a power of a size in bits of the modulus, taken modulo the modulus.

Example 18 is a method performed by a processor. The method includes receiving an instruction at the processor. The instruction indicates at least one storage location storing a first integer, a second integer, and a modulus. The method also includes storing a Montgomery multiplication product corresponding to the first integer, the second integer, and the modulus, in a destination storage location, in response to the instruction.

Example 19 includes the method of Example 18, in which said receiving includes receiving the instruction indicating a register storing memory address information identifying a storage location in a memory that stores at least one of the first integer and the second integer. Also, optionally in which the instruction implicitly indicates that the destination storage location, where the Montgomery multiplication product is to be stored, is to be the storage location in the memory. Also, optionally in which said storing includes storing the Montgomery multiplication product over said one of the first integer and the second integer.

Example 20 includes the method of any one of Examples 18 to 19, in which said receiving includes receiving the instruction indicating a size of the modulus.

Example 21 is a computer system or other system to process instructions. The system includes an interconnect, a dynamic random access memory (DRAM) coupled with the interconnect, and a processor coupled with the interconnect. The processor is to receive an instruction that is to indicate at least one storage location that is to store a first integer, a second integer, and a modulus. The processor, in response to the instruction, is to store a Montgomery multiplication product corresponding to the first integer, the second integer, and the modulus, in a destination storage location.

Example 22 includes the system of Example 21, in which the instruction is to indicate a first Montgomery multiplication constant that is to be equal to a negative inverse of the modulus taken modulo two raised to a power of a word size of the processor.

Example 23 is an article of manufacture including a non-transitory machine-readable storage medium. The non-transitory machine-readable storage medium storing a plurality of instructions including a first instruction. The first instruction, if executed by a machine, is to cause the machine to perform operations including to access a first integer, a second integer, and a modulus from at least one storage location that is to be indicated by the first instruction. The operations also include to store a Montgomery multiplication product corresponding to the first integer, the second integer, and the modulus, in a destination storage location of the first instruction.

Example 24 includes the article of manufacture of Example 23, the first instruction, if executed by the machine, is to cause the machine to perform operations including to calculate a first Montgomery multiplication constant that is to be equal to a negative inverse of the modulus taken modulo two raised to a power of a word size of the processor.

Example 25 is a processor or other apparatus that includes a decode unit to decode an instruction. The instruction to indicate at least one storage location that is to store: (a) a source Montgomery multiplication accumulated partial product that corresponds to an iteration immediately prior to an i-th iteration of a Montgomery multiplication; (b) a modulus; (c) an i-th portion of a first integer; (d) a second integer that has a same size as the first integer; and (e) an intermediate result of prior calculations for the i-th iteration of the Montgomery multiplication. The processor or other apparatus also includes an execution unit coupled with the decode unit. The execution unit, in response to the instruction, is to store a result Montgomery multiplication accumulated partial product, for the i-th iteration of the Montgomery multiplication, in a destination storage location.

Example 26 includes the processor or other apparatus of Example 25, in which the execution unit, in response to the instruction, is to store the result Montgomery multiplication accumulated partial product which is to be equal to the source Montgomery multiplication accumulated partial product, added to a product of the i-th portion of the first integer and the second integer, added to a product of the intermediate result of the prior calculations and the modulus, taken modulo two raised to a power of a word length of the processor.

Example 27 includes the processor or other apparatus of any one of Examples 25 to 26, in which the decode unit is to decode the instruction that is to indicate a register of the plurality of registers that is to store memory address information to identify a storage location in a memory that is to store the source Montgomery multiplication accumulated partial product.

Example 28 includes the processor or other apparatus of Example 27, in which the second integer and the modulus are also to be stored in the storage location in the memory.

Example 29 includes the processor or other apparatus of any one of Examples 27 to 28, in which the decode unit is to decode the instruction that is to implicitly indicate that the destination storage location, where the result Montgomery multiplication accumulated partial product is to be stored, is to be the storage location in the memory. Also, optionally in which the execution unit, in response to the instruction, is to store the result Montgomery multiplication accumulated partial product over the source Montgomery multiplication accumulated partial product.

Example 30 includes the processor or other apparatus of any one of Examples 25 to 29, in which the decode unit is to decode the instruction that is to indicate a size of the modulus.

Example 31 includes the processor or other apparatus of Example 30, in which the decode unit is to decode the instruction that is operative to indicate the size of the modulus as ranging from at least 1024-bits to at least 8192-bits.

Example 32 includes the processor or other apparatus of any one of Examples 25 to 31, in which the decode unit is to decode the instruction that is to indicate a register that is to store the i-th portion of the first integer.

Example 33 includes the processor or other apparatus of any one of Examples 25 to 32, in which the decode unit is to decode the instruction that is to indicate a register that is to store the intermediate result of the prior calculations for the i-th iteration of the Montgomery multiplication.

Example 34 includes the processor or other apparatus of any one of Examples 25 to 33, in which the intermediate result of the prior calculations for the i-th iteration of the Montgomery multiplication is to be equal to a least significant portion of the source Montgomery multiplication accumulated partial product, added to a product of the i-th portion of a first integer multiplied by a least significant portion of the second integer multiplied by the modulus, taken modulo two raised to a power of a word size of the processor.

Example 35 is a method in a processor that includes receiving an instruction. The instruction indicates at least one storage location that stores: (a) a source Montgomery multiplication accumulated partial product corresponding to an iteration immediately prior to an i-th iteration of a Montgomery multiplication; (b) a modulus; (c) an i-th portion of a first integer; (d) a second integer that has a same size as the first integer; and (e) an intermediate result of prior calculations for the i-th iteration of the Montgomery multiplication. The method also includes storing a result Montgomery multiplication accumulated partial product, for the i-th iteration of the Montgomery multiplication, in a destination storage location, in response to the instruction.

Example 36 is a processor or other apparatus that includes means for receiving an instruction. The instruction to indicate at least one storage location that is to store a first integer, a second integer, and a modulus. The apparatus also includes means for storing a Montgomery multiplication product corresponding to the first integer, the second integer, and the modulus, in a destination storage location, in response to the instruction.

Example 37 includes the processor of any one of Examples 1 to 17, further including an optional branch prediction unit to predict branches, and an optional instruction prefetch unit, coupled with the branch prediction unit, the instruction prefetch unit to prefetch instructions including the instruction. The processor may also optionally include an optional level 1 (L1) instruction cache coupled with the instruction prefetch unit, the L1 instruction cache to store instructions, an optional L1 data cache to store data, and an optional level 2 (L2) cache to store data and instructions. The processor may also optionally include an instruction fetch unit coupled with the decode unit, the L1 instruction cache, and the L2 cache, to fetch the instruction, in some cases from one of the L1 instruction cache and the L2 cache, and to provide the instruction to the decode unit. The processor may also optionally include a register rename unit to rename registers, an optional scheduler to schedule one or more operations that have been decoded from the instruction for execution, and an optional commit unit to commit execution results of the instruction.

Example 38 includes a system-on-chip that includes at least one interconnect, the processor of any one of Examples 1 to 17 coupled with the at least one interconnect, an optional level 2 (L2) cache coupled with the at least one interconnect, at least one optional memory controller coupled with the at least one interconnect, at least one optional coprocessor coupled with the at least one interconnect, at least one optional Ethernet controller coupled with the at least one interconnect, at least one optional Serial Advanced Technology Attachment (SATA) controller coupled with the at least one interconnect, at least one optional Peripheral Component Interconnect Express (PCIe) controller coupled with the at least one interconnect, and at least one optional redundant array of independent disks (RAID) controller coupled with the at least one interconnect.

Example 39 is a processor or other apparatus that includes means for performing the method of any one of Examples 18 to 20.

Example 40 is an optionally non-transitory and/or tangible machine-readable medium, which optionally stores or otherwise provides instructions including a first instruction, the first instruction if and/or when executed by a processor, computer system, electronic device, or other machine, is operative to cause the machine to perform the method of any one of Examples 18 to 20.

Example 41 is a processor or other apparatus substantially as described herein.

What is claimed is:

1. A processor comprising:
   a plurality of registers;
   a decode unit to decode an instruction of an instruction set of the processor, the instruction to indicate at least one storage location that is to store a first integer, a second integer, and a modulus, and the instruction to indicate a general-purpose register that is to store a first Montgomery multiplication constant that is to be equal to a negative inverse of the modulus taken modulo two raised to a power of a word size of the processor, the first Montgomery multiplication constant to be expressed as a 64-bit value; and
   an execution unit coupled with the decode unit, and coupled with the plurality of registers, the execution unit, in response to the instruction, to store a Montgomery multiplication product corresponding to the first integer, the second integer, and the modulus, in a destination storage location, wherein it is implicit to the instruction that the Montgomery multiplication product is to be stored in the destination storage overwriting at least one of the first and second integers but not the modulus.

2. The processor of claim 1, wherein the decode unit is to decode the instruction that is to indicate a register of the plurality of registers that is to store memory address information to identify a storage location in a memory that is to store at least one of the first integer and the second integer.

3. The processor of claim 2, wherein the decode unit is to decode the instruction that is to implicitly indicate that the destination storage location, where the Montgomery multiplication product is to be stored, is to be the storage location in the memory, and wherein the execution unit, in response to the instruction, is to store the Montgomery multiplication product to the destination storage location overwriting said one of the first integer and the second integer.

4. The processor of claim 2, wherein the first integer, the second integer, and the modulus are to be stored in the storage location in the memory.

5. The processor of claim 1, wherein the decode unit is to decode the instruction that is to indicate a size of the modulus.

6. The processor of claim 5, wherein the decode unit is to decode the instruction that is to have an immediate that is to indicate the size of the modulus as a number of fixed bit length segments, each fixed bit length segment to have a size in bits that is one of 8-bits, 16-bits, 32-bits, 64-bits, 128-bits, and 256-bits.

7. The processor of claim 5, wherein the decode unit is to decode the instruction that is operative to indicate the size of the modulus as ranging from 1024-bits to 16384-bits.

8. The processor of claim 1, wherein the decode unit is to decode the instruction that is to indicate a register of the plurality of registers that is to store memory address information to identify a storage location in a memory that is to store the first Montgomery multiplication constant along with at least one of the first integer, the second integer, and the modulus.

9. The processor of claim 1, wherein the decode unit is to decode the instruction that is to have an implicit 64-bit word size, and wherein the execution unit is to perform the instruction with the 64-bit word size.

10. The processor of claim 1, wherein the decode unit is to decode the instruction that is to have an implicit 32-bit word size, and wherein the execution unit is to perform the instruction with the 32-bit word size.

11. The processor claim 1, wherein the execution unit, in response to the instruction, is to store the Montgomery multiplication product that is to be equal to a product of the first and second integers, divided by a second Montgomery multiplication constant, taken modulo the modulus, where the second Montgomery multiplication constant is to be equal to two, raised to a power of a size in bits of the modulus, taken modulo the modulus.

12. A processor comprising:
a plurality of registers;
a decode unit to decode an instruction of an instruction set of the processor, the instruction to indicate at least one storage location that is to store a first integer, a second integer, and a modulus, wherein the decode unit is to decode the instruction that is agnostic to a word size of the processor; and
an execution unit coupled with the decode unit, and coupled with the plurality of registers, the execution unit, in response to the instruction, to:
calculate a first Montgomery multiplication constant that is to be equal to a negative inverse of the modulus taken modulo two raised to a power of a word size of the processor, the first Montgomery multiplication constant to be expressed as a 64-bit value;
use the first Montgomery multiplication constant to calculate a Montgomery multiplication product corresponding to the first integer, the second integer, and the modulus; and
store the Montgomery multiplication product in a destination storage location, wherein it is implicit to the instruction that the Montgomery multiplication product is to be stored in the destination storage overwriting at least one of the first and second integers but not the modulus.

13. A method performed by a processor comprising:
receiving an instruction at the processor, the instruction of an instruction set of the processor and indicating at least one storage location storing a first integer, a second integer, and a modulus, and the instruction indicating a general-purpose register storing a first Montgomery multiplication constant that is equal to a negative inverse of the modulus taken modulo two raised to a power of a word size of the processor, the first Montgomery multiplication constant to be expressed as a 64-bit value;
decoding the instruction with a decode unit of the processor; and
storing, with an execution unit of the processor, a Montgomery multiplication product corresponding to the first integer, the second integer, and the modulus, in a destination storage location, in response to the instruction, wherein it is implicit to the instruction that the Montgomery multiplication product is to be stored in the destination storage overwriting at least one of the first and second integers but not the modulus.

14. The method of claim 13, wherein said receiving comprises receiving the instruction indicating a register storing memory address information identifying a storage location in a memory that stores at least one of the first integer and the second integer, and that implicitly indicates that the destination storage location, where the Montgomery multiplication product is to be stored, is to be the storage location in the memory, and wherein said storing comprises overwriting said one of the first integer and the second integer with the Montgomery multiplication product.

15. The method of claim 13, wherein said receiving comprises receiving the instruction indicating a size of the modulus.

16. A system to process instructions comprising:
an interconnect;
a dynamic random access memory (DRAM) coupled with the interconnect; and
a processor coupled with the interconnect, the processor to receive an instruction of an instruction set of the processor that is to indicate at least one storage location that is to store a first integer, a second integer, and a modulus, and the instruction to indicate a general-purpose register that is to store a first Montgomery multiplication constant that is to be equal to a negative inverse of the modulus taken modulo two raised to a power of a word size of the processor, the first Montgomery multiplication constant to be expressed as a 64-bit value, the processor including a decode unit to decode the instruction, and an execution unit, in response to the instruction, to store a Montgomery multiplication product corresponding to the first integer, the second integer, and the modulus, in a destination storage location,
wherein it is implicit to the instruction that the Montgomery multiplication product is to be stored in the destination storage overwriting at least one of the first and second integers but not the modulus.

17. An article of manufacture comprising a non-transitory machine-readable storage medium, the non-transitory machine-readable storage medium storing a plurality of instructions including a first instruction of an instruction set of a processor, the first instruction, if executed by a machine having the processor, is to cause the machine to perform operations comprising:
access a first integer, a second integer, and a modulus from at least one storage location that is to be indicated by the first instruction;
access a first Montgomery multiplication constant from a general-purpose register that is to be indicated by the first instruction, the first Montgomery multiplication constant to be equal to a negative inverse of the modulus taken modulo two raised to a power of a word size of the processor, the first Montgomery multiplication constant to be expressed as a 64-bit value; and
store a Montgomery multiplication product corresponding to the first integer, the second integer, and the modulus, in a destination storage location of the first instruction,
wherein it is implicit to the instruction that the Montgomery multiplication product is to be stored in the destination storage overwriting at least one of the first and second integers but not the modulus.

18. The article of manufacture of claim 17, the first instruction, if executed by the machine, is to cause the machine to perform operations comprising to calculate the first Montgomery multiplication constant.

19. A processor comprising:

a plurality of registers;

a decode unit to decode an instruction of an instruction set of the processor, the instruction to indicate at least one storage location that is to store:

a source Montgomery multiplication accumulated partial product that corresponds to an iteration immediately prior to an i-th iteration of a Montgomery multiplication, wherein the decode unit is to decode the instruction that is to indicate a register of the plurality of registers that is to store memory address information to identify a storage location in a memory that is to store the source Montgomery multiplication accumulated partial product;

a modulus;

an i-th portion of a first integer;

a second integer that has a same size as the first integer; and an intermediate result of prior calculations for the i-th iteration of the Montgomery multiplication; and an execution unit coupled with the decode unit, the execution unit, in response to the instruction, to generate and store only a single Montgomery multiplication accumulated partial product, for the i-th iteration of the Montgomery multiplication, in a destination storage location, the single Montgomery multiplication accumulated partial product consistent with multiplication of the modulus and the intermediate result of the prior calculations for the i-th iteration of the Montgomery multiplication, wherein execution of the instruction is to stop after the generation and storage of said only the single Montgomery multiplication accumulated partial product, wherein the instruction implicitly indicates that the destination storage location, where the single Montgomery multiplication accumulated partial product is to be stored, is to be the storage location in the memory, and wherein the execution unit, in response to the instruction, is to store the single Montgomery multiplication accumulated partial product over the source Montgomery multiplication accumulated partial product.

20. The processor of claim 19, wherein the execution unit, in response to the instruction, is to store the single Montgomery multiplication accumulated partial product which is to be equal to the source Montgomery multiplication accumulated partial product, added to a product of the i-th portion of the first integer and the second integer, added to a product of the intermediate result of the prior calculations and the modulus, taken modulo two raised to a power of a word length of the processor.

21. The processor of claim 19, wherein the decode unit is to decode the instruction that is to indicate a size of the modulus.

22. The processor of claim 19, wherein the intermediate result of the prior calculations for the i-th iteration of the Montgomery multiplication is to be equal to a least significant portion of the source Montgomery multiplication accumulated partial product, added to a product of the i-th portion of a first integer multiplied by a least significant portion of the second integer multiplied by the modulus, taken modulo two raised to a power of a word size of the processor.

* * * * *